United States Patent [19]

Andre

[11] Patent Number: 5,080,541
[45] Date of Patent: Jan. 14, 1992

[54] ARTICULATED CAR CARRIER CONVOY WITH INDIVIDUAL CARRYING PLATFORMS CAPABLE OF COMPOUND MOVEMENTS

[75] Inventor: Jean-Luc Andre, Dangolsheim, France

[73] Assignee: Lohr Industrie, S.A., Hangenbieten, France

[21] Appl. No.: 390,552

[22] Filed: Aug. 7, 1989

[30] Foreign Application Priority Data

Aug. 5, 1988 [FR] France .................. 88 10782

[51] Int. Cl.$^5$ .............................................. B60P 3/08
[52] U.S. Cl. ...................................... 410/24.1; 410/26
[58] Field of Search .................. 410/3, 4, 6, 8, 15, 410/24, 26, 27, 24.1, 29, 29.1, 25, 61; 254/102; 414/229

[56] References Cited

U.S. PATENT DOCUMENTS

| | | | |
|---|---|---|---|
| 2,934,319 | 4/1960 | Wahlstrom | 254/102 |
| 3,084,970 | 4/1963 | Day | 410/24.1 |
| 3,690,717 | 9/1972 | Taylor | 410/24.1 |
| 3,880,457 | 4/1975 | Jones, Jr. | 410/29.1 |
| 4,081,196 | 3/1978 | Dandridge, Jr. | 410/24.1 |
| 4,221,422 | 9/1980 | Harold | 410/24.1 |
| 4,369,008 | 1/1983 | Cooper | 410/24.1 |
| 4,455,119 | 6/1984 | Smith | 410/25 |
| 4,609,179 | 9/1986 | Chern et al. | 254/102 |
| 4,792,268 | 12/1988 | Smith | 410/25 |
| 4,804,066 | 2/1989 | Fusaro et al. | 414/229 |

FOREIGN PATENT DOCUMENTS 2179896 3/1987 United Kingdom ............... 410/6

Primary Examiner—Joseph F. Peters, Jr.
Assistant Examiner—Virna Lissi Mojica
Attorney, Agent, or Firm—Schwartz & Weinrieb

[57] ABSTRACT

Articulated automobile carrier with individual movable platforms.

Articulated automobile carrier characterized in that the automobile carrying structures (55) of the truck (1) and of the trailer (2) are made up mainly of unit support assemblies each controlling the displacement of a single platform through two screws (5) and (6) alongside the adjacent posts (2) and (3), screws on which are mounted blocks connected mechanically to each side of each carrying platform (9) for the purpose of the execution of the compound movements thereof in position and in slope, and of the platforms forming several access ramps for most of the vehicles at the rear of the carrier up to their respective platforms thus making it possible to effect automated loading and unloading phases.

This invention is of interest to the builders of automobile carrying bodies for utility vehicles.

11 Claims, 22 Drawing Sheets

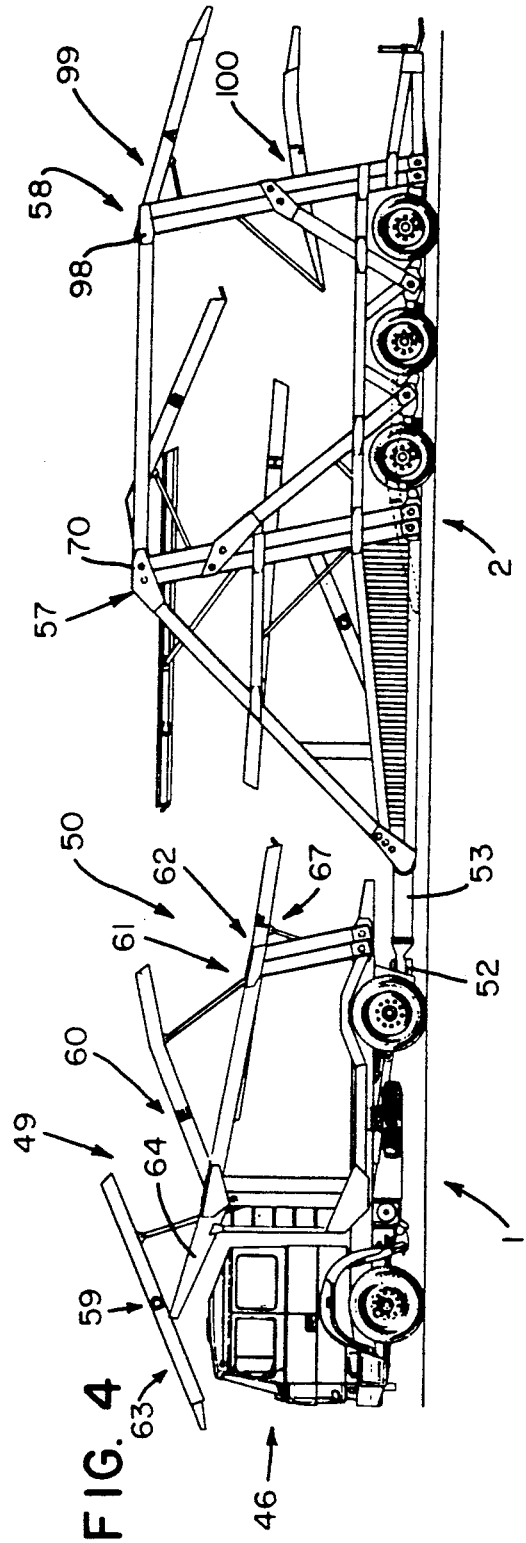
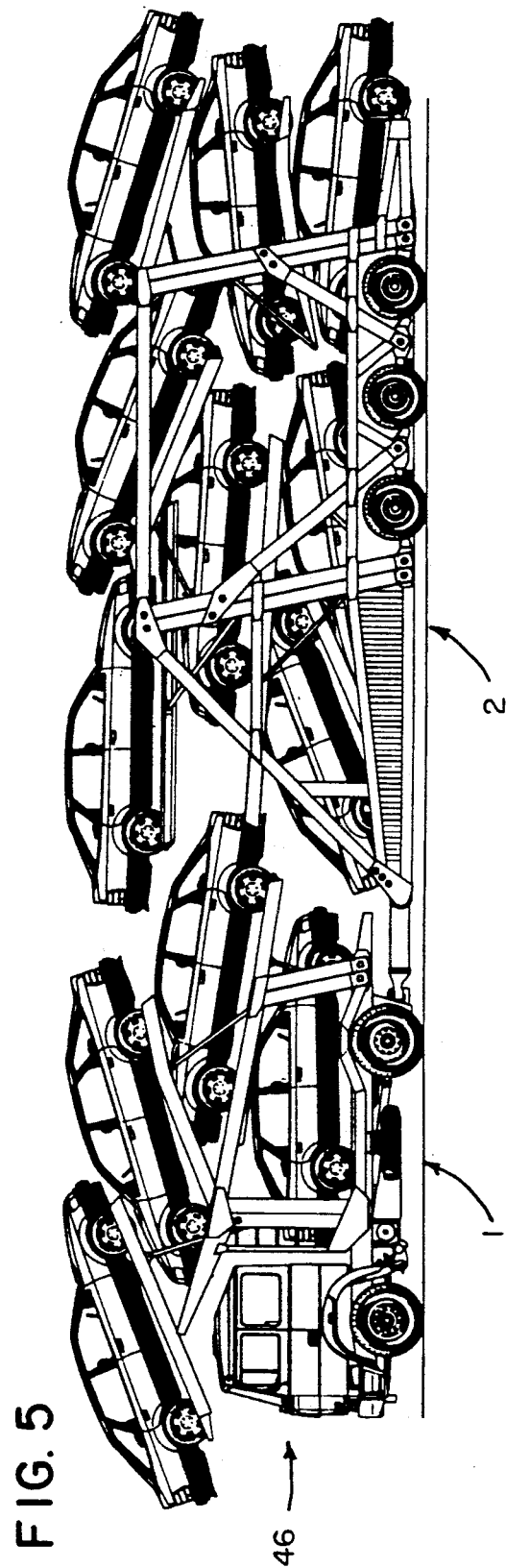
FIG. 4
FIG. 5

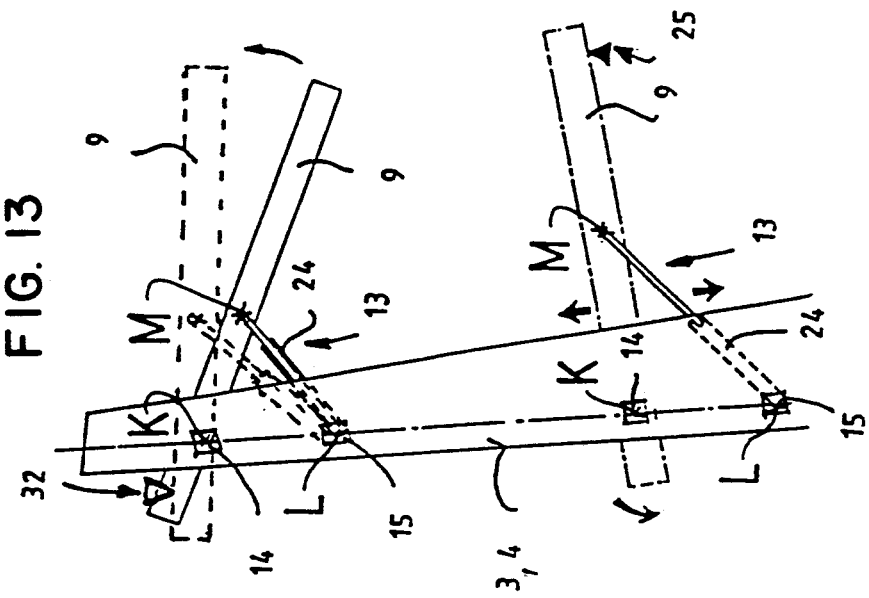
FIG. 13
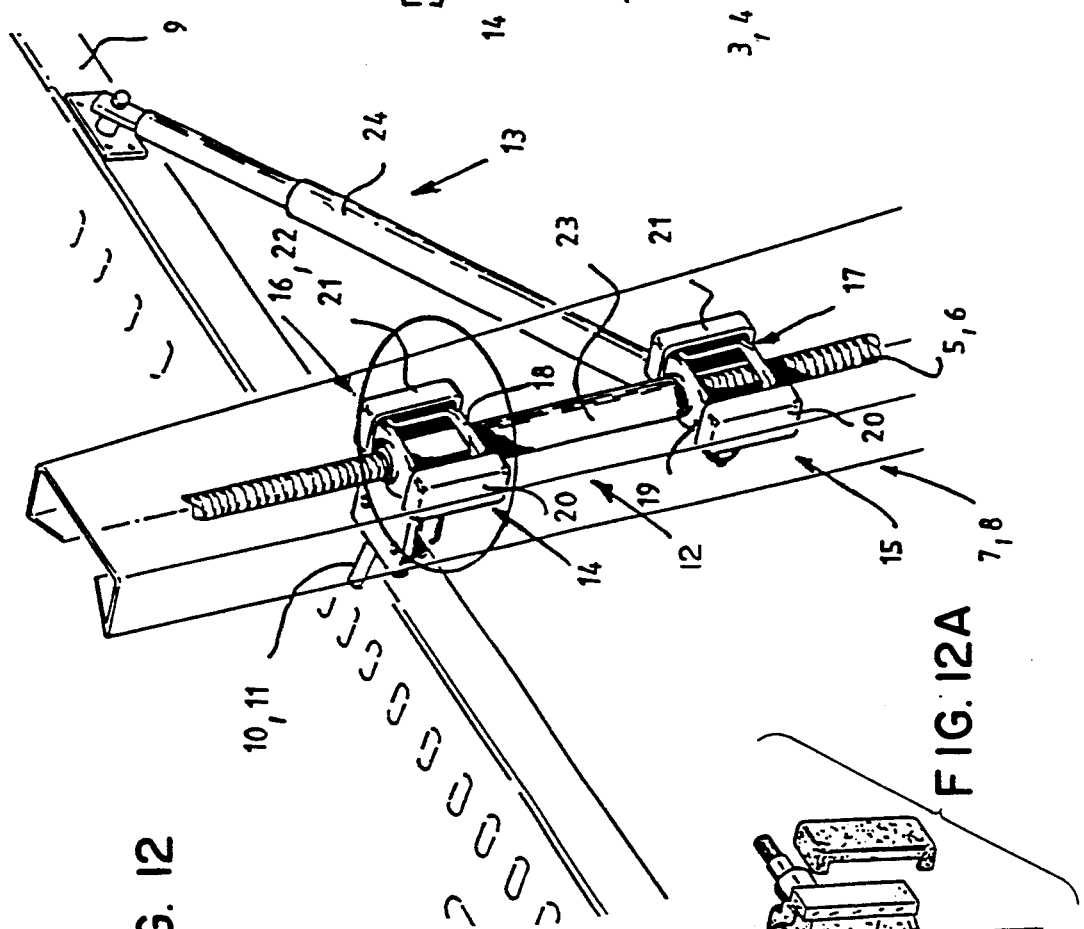
FIG. 12
FIG. 12A

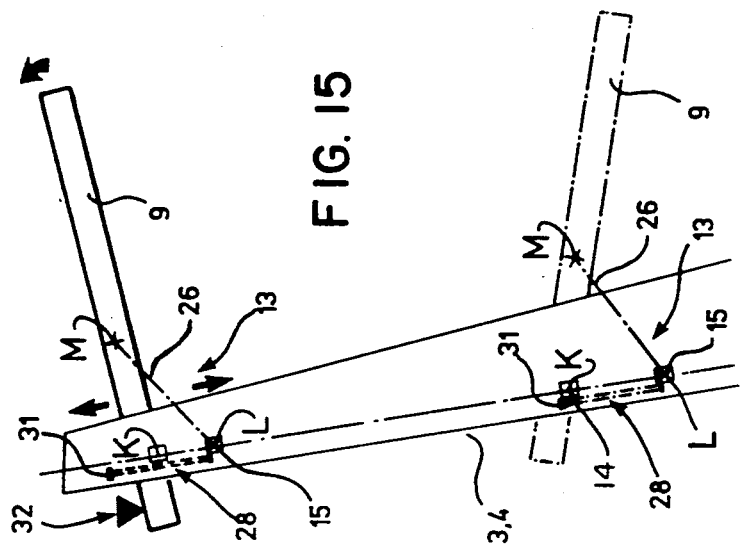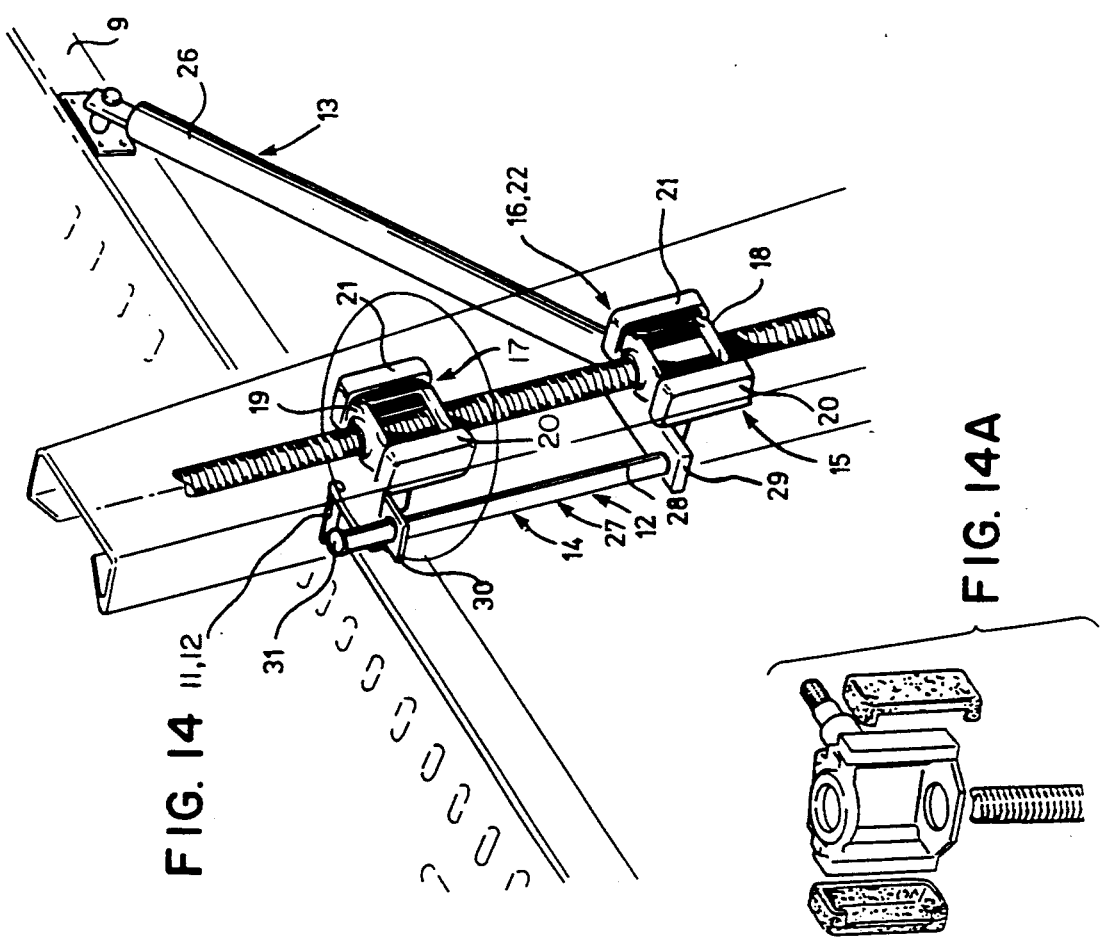

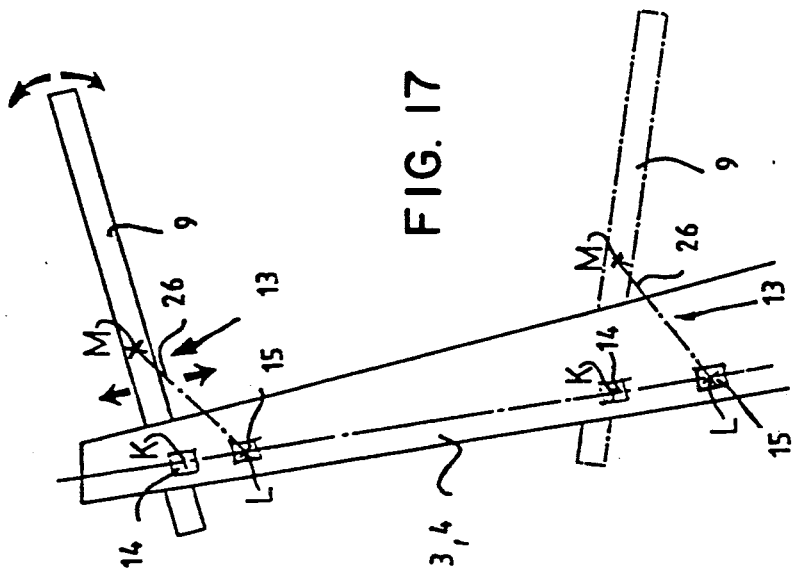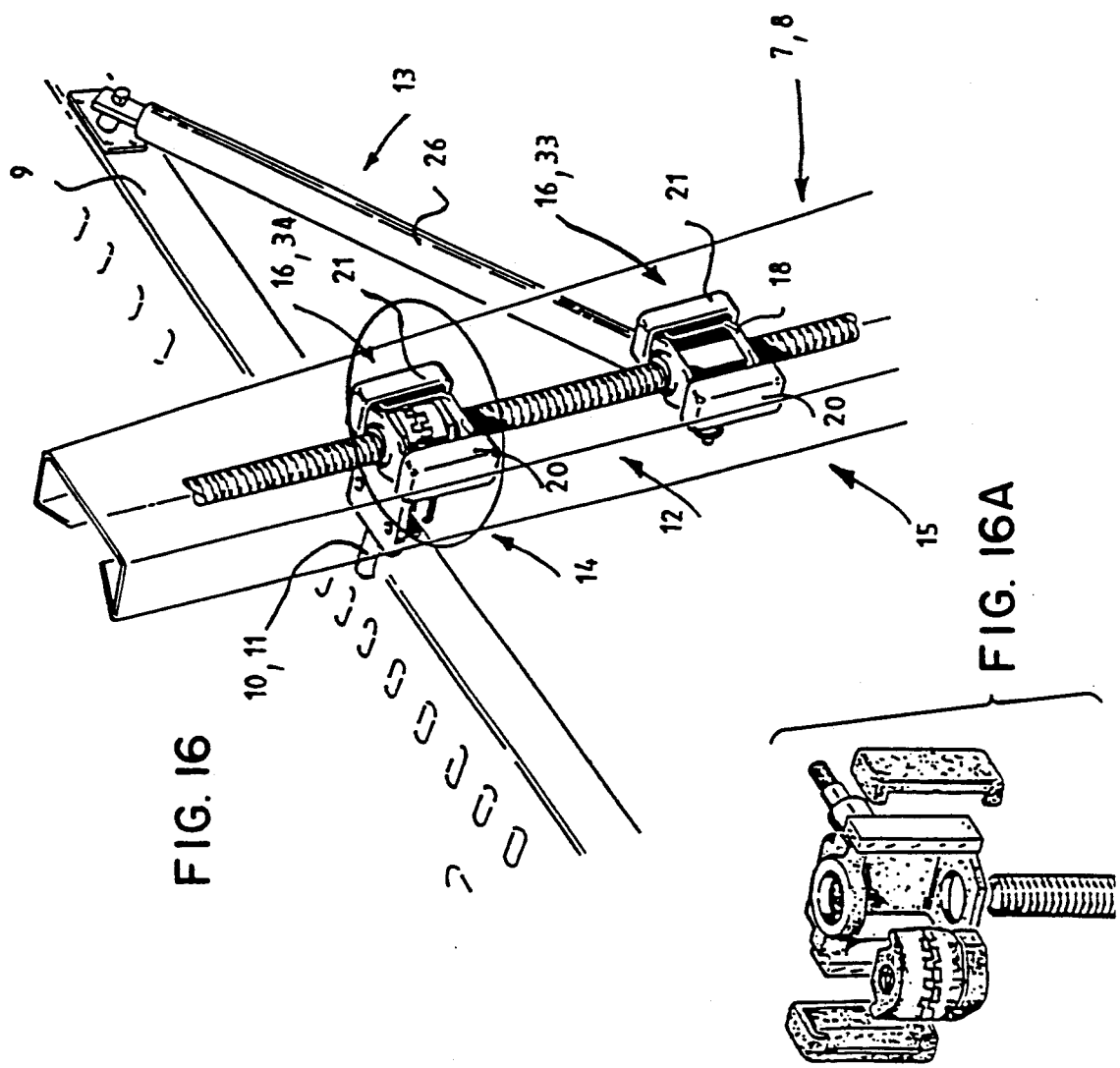

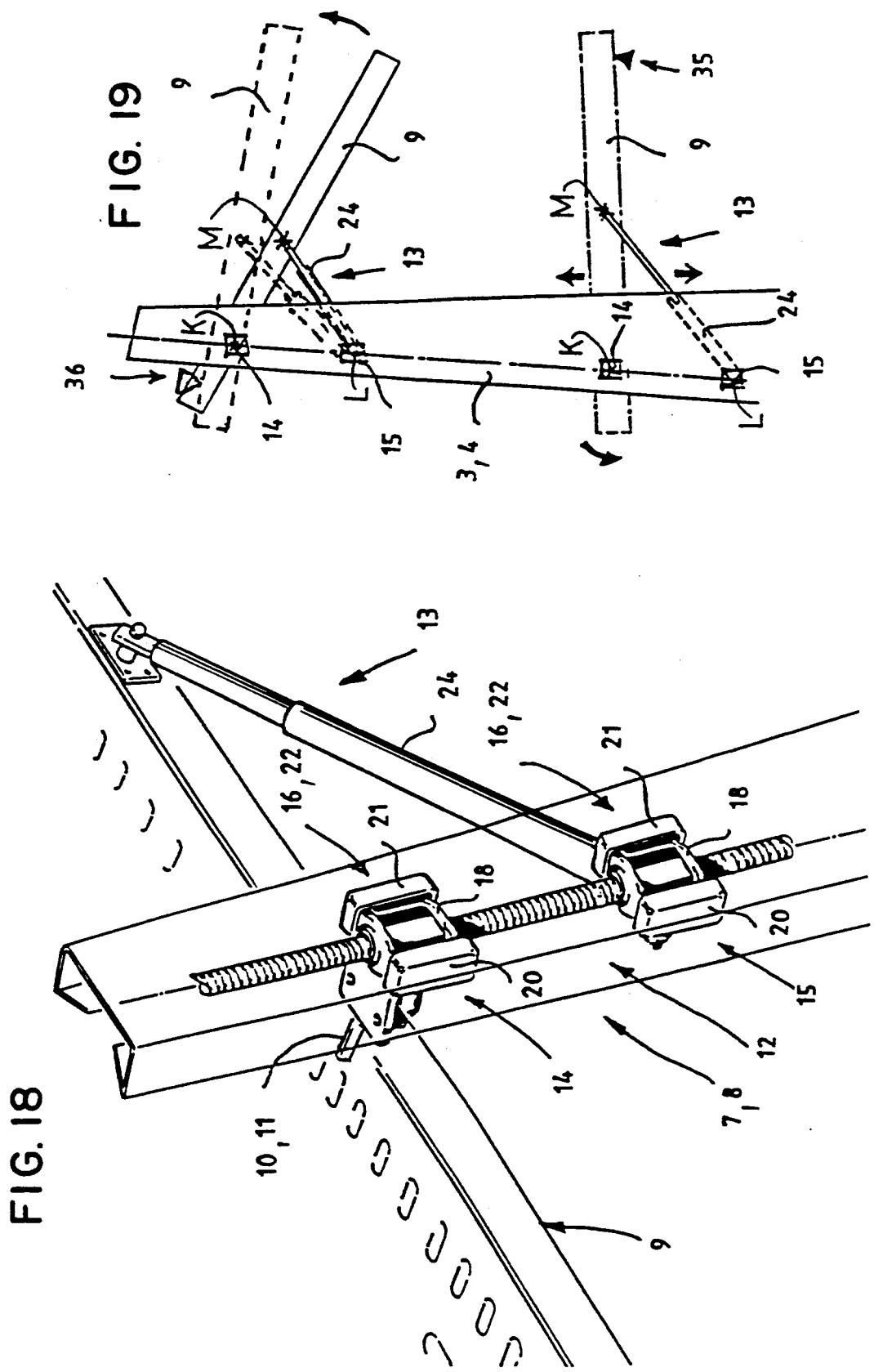

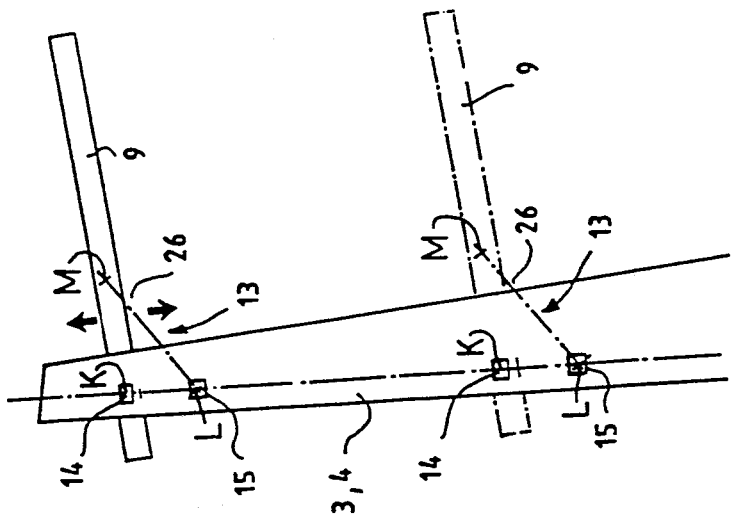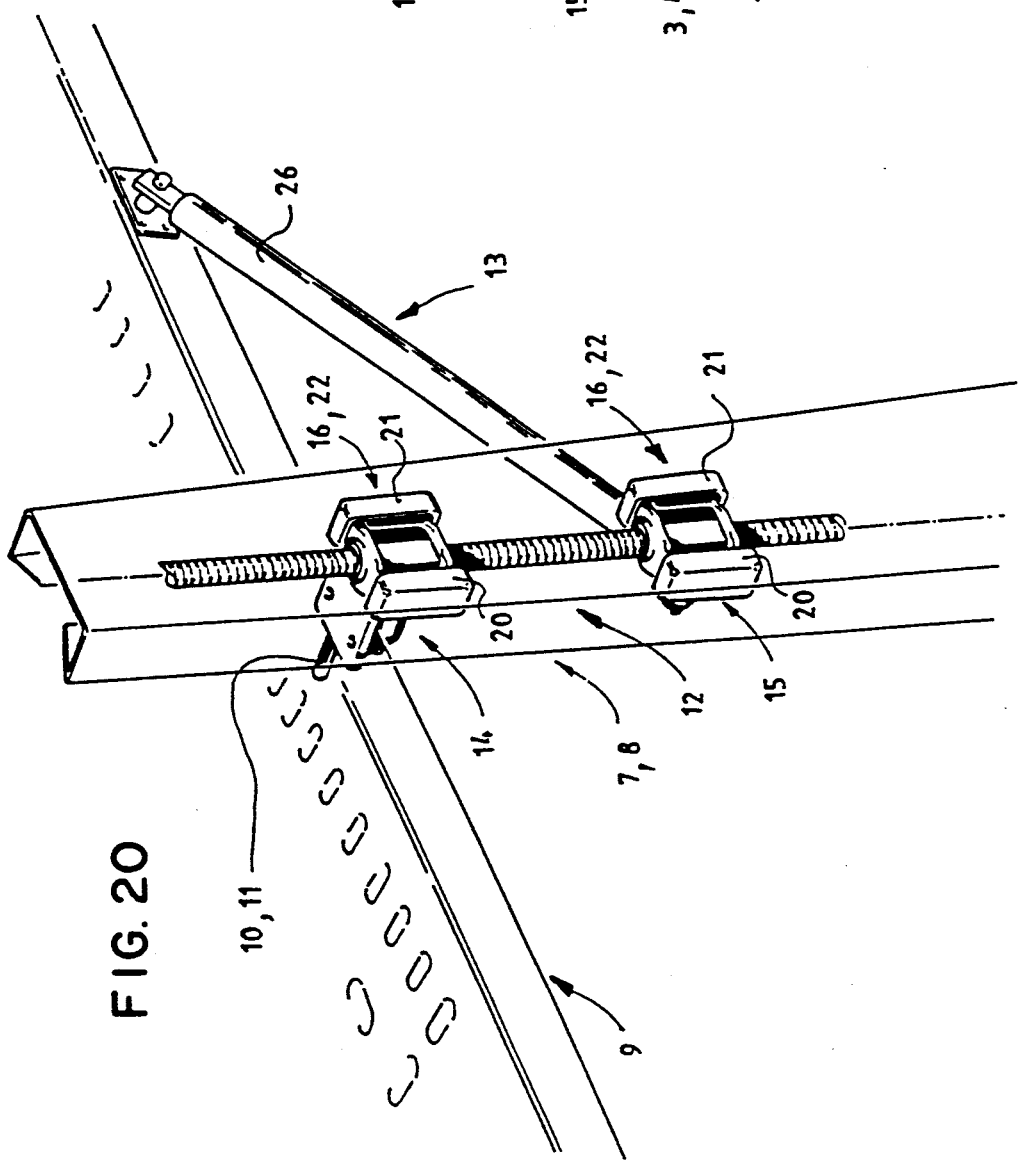

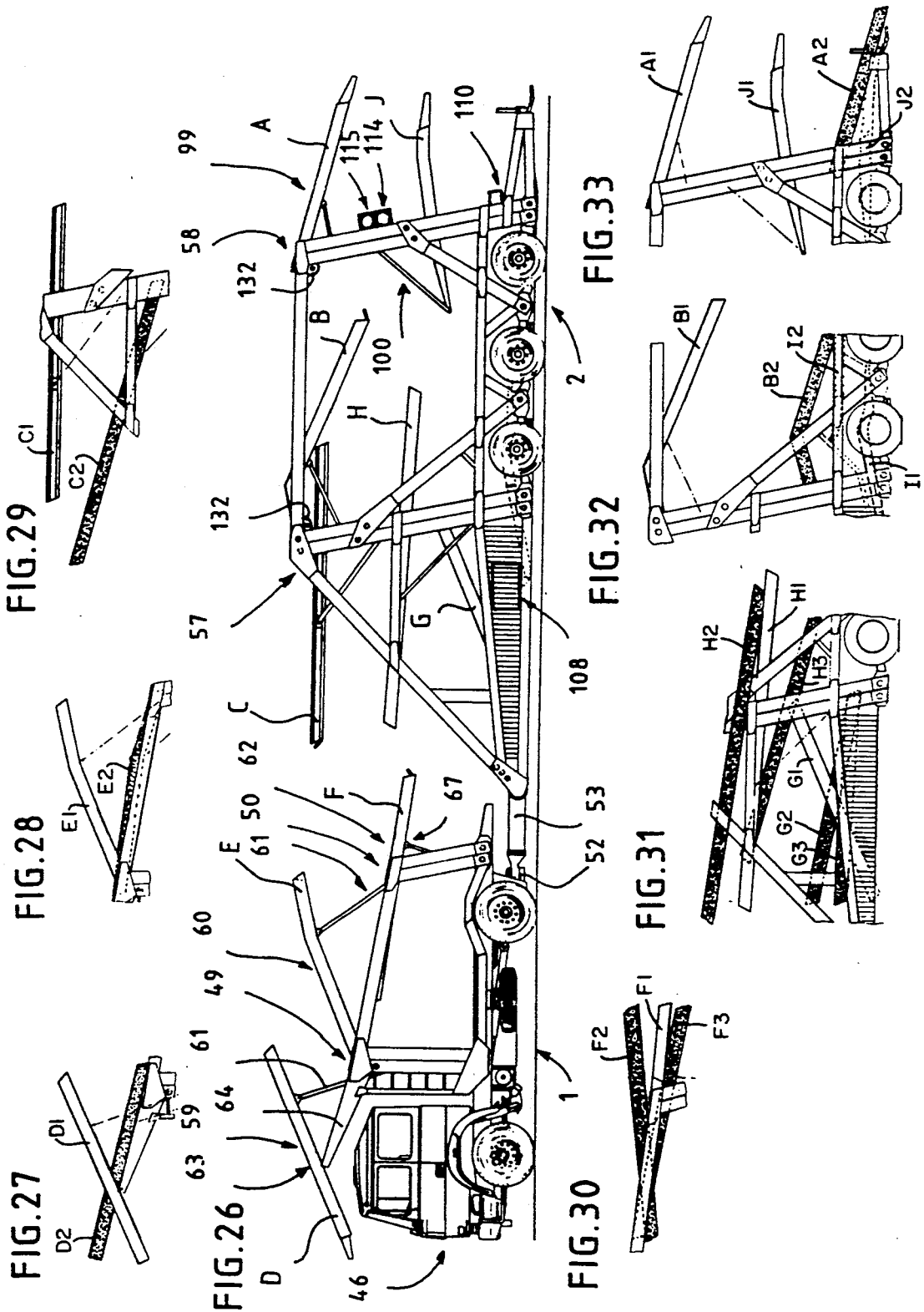

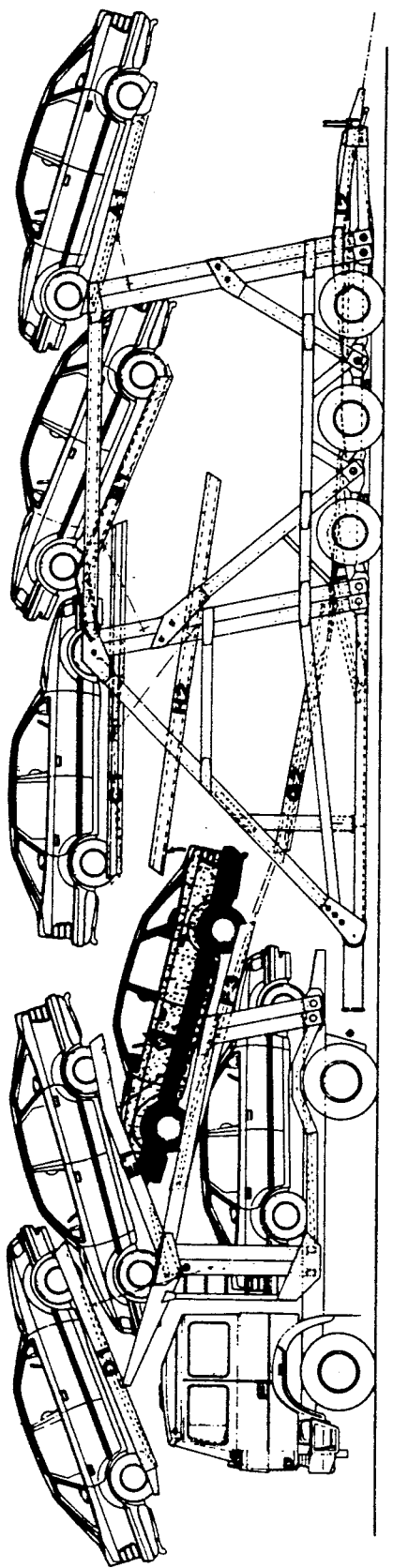
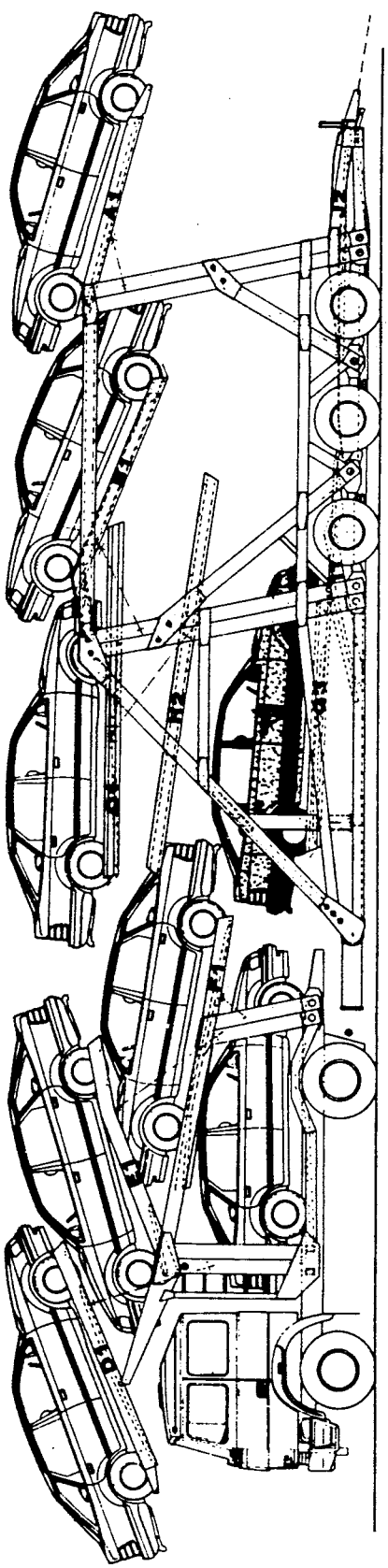
FIG. 40
FIG. 41

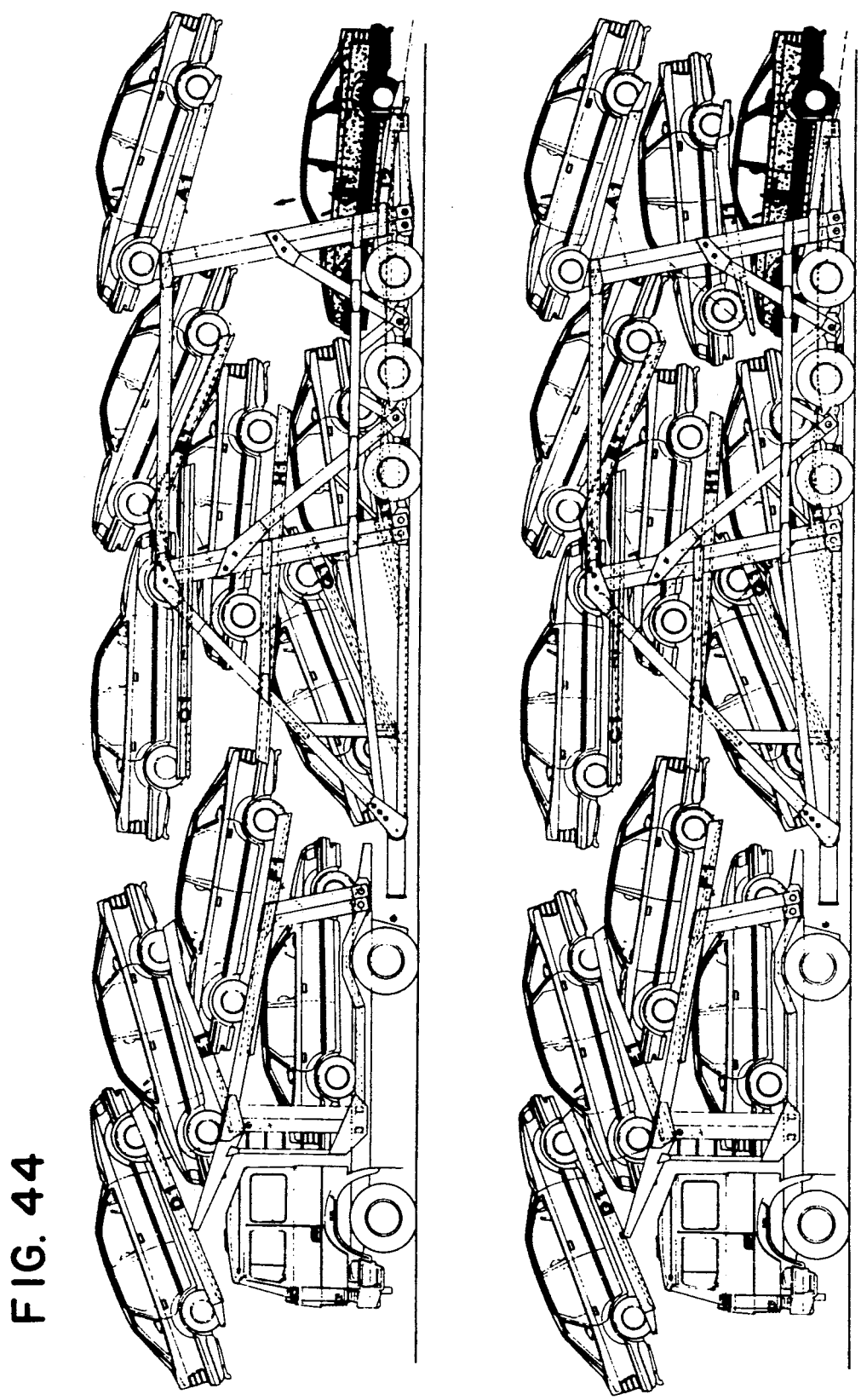

ARTICULATED CAR CARRIER CONVOY WITH INDIVIDUAL CARRYING PLATFORMS CAPABLE OF COMPOUND MOVEMENTS

FIELD OF THE INVENTION

This invention concerns an articulated automobile carrier with individual carrying platforms with predetermined movements as to position and slope making it possible to effect automated loading and unloading phases.

BACKGROUND OF THE INVENTION

For reasons of profitability, the owners of automobile carrying vehicles attempt to benefit by all possibilities of profit in the operation of their equipment.

Organization and rationalization methods for transportation programs cannot give additional returns, as advantage is already taken of all benefits of an administrative nature.

There remain only the technical improvements to the carrying structures and their control.

The purpose of this invention is to improve substantially the performance of automobile carriers, particularly as to the two following fundamental points.

These are, on the one hand, the substantial improvement of the loading capacity of the structures supporting the automobiles, and, on the other hand, the speed of placement, that is to say, a substantial gain in time over the duration of the loading and unloading phases.

In accordance with the invention, the technique of overlapping of the automobiles makes it possible to increase the transportation capacity within the same authorized road plan.

Insofar as the speed of loading is concerned, the makeup in individual and movable carrying platforms next to each other in the lower part in order to form an access ramp and the automatic operation when loaded, in compound movements, until they reach a final position, ensure a rapid and efficient placement in the best possible arrangement for the various types of automobiles and loads.

Profitability is thus ensured within the constraints of road regulations.

In fact, the automatic loading becomes independent of the quality and speed of the operator.

This invention executes simultaneously the goals outlined above.

SUMMARY OF THE INVENTION

For this purpose it relates to an articulated automobile carrier with individual movable carrying platforms characterized by the fact that the automobile carrying structures of the truck and trailers are made up mostly of unit supporting assemblies each controlling the displacement of a single platform through two screws alongside adjacent posts, screws on which are mounted blocks linked mechanically on each side of each carrying platform with a view to the execution of their compound movements in position and in slope, the movements of the various platforms being coordinated with each other and by the platforms following each other in a given position in order to form several access ramps for most of the vehicles in the rear of carrier up to their respective platforms, thus making it possible to execute automated loading and unloading phases.

Numerous advantages are derived from this invention, the main ones being indicated below:
- integral automation possible for a repetitive type of load;
- substantial gain in time during the loading and unloading phases;
- elimination of any human error;
- increase in capacity;
- great variety in possible movements;
- greater security for the automobiles transported and for the user during loading and unloading phases.

BRIEF DESCRIPTION OF THE DRAWINGS

The invention will be properly understood upon reading the description below which serves as a non limitative example of the illustrated embodiments when referring to the drawings attached, in which: like reference characters designate like or corresponding parts throughout the several views and wherein

FIG. 4 is a general side view of an example of an automobile carrier not loaded, in accordance with a perfected variation, of that represented in FIG. 1;

FIG. 5 is a general side view of the automobile carrier loaded conforming with that represented in FIG. 4;

FIG. 6 is an example of a chassis post with a transfer case for the movement for the displacement of the platform, FIG. 7 is the upper part of the truck carrying structure, FIG. 8 is a trailer support assembly of a movable platform articulated on two sloping posts, FIG. 9 is a general structure of the forward composite support assembly of the trailer in side view.

FIGS. 12 to 25 are perspective views and their corresponding simplified schematics showing some examples of displacement mechanisms of the platforms in compound movements along the interior screw of the support posts with schematic representations of the corresponding extreme positions of the platforms, wherein FIG. 12: upper nut linked rigidly to a lower translation bushing and variable length rod, FIG. 13: corresponding schematic drawing, FIG. 14: upper translation bushing, lower nut and fixed length rod, FIG. 15: corresponding schematic drawing, FIG. 16: upper releasable nut, simple lower nut and fixed length rod, FIG. 17: corresponding schematic drawing, FIG. 18: upper and lower nuts and variable length rod, FIG. 19: corresponding schematic drawing, FIG. 20: upper and lower nuts and fixed length rod,
FIG. 21: corresponding schematic drawing,
FIG. 22: upper nut linked rigidly to a lower translation bushing and fixed length rod,
FIG. 23: corresponding schematic drawing,
FIG. 24: releasable upper and lower nuts, fixed length rod with simple nut translation mechanism and fixed length rod,
FIG. 25: corresponding schematic drawing,
FIG. 26 is a composite view illustrating, as seen from the side in its entirety, the carrier not loaded exploded in areas of detail at the level of the platforms in accordance with the following figures in order to show the movements of the various platforms during the phases of loading and unloading, figures on which the intermediate positions of the platforms are represented in black:
FIG. 27 truck upper forward platform D,
FIG. 28 truck upper middle platform E,
FIG. 29 trailer forward upper platform C,
FIG. 30 truck rear upper platform F,
FIG. 31 trailer intermediate forward platform H and trailer lower forward platform G,
FIG. 32 trailer upper middle platform B and trailer lower middle platform I,
FIG. 33 trailer upper rear platform A and trailer intermediate rear platform J,
FIGS. 34 to 45 are side schematic views illustrating the operation from the loading of the first automobile to the putting in place of the last automobile on the rear lower platform of the trailer in the case of an example of bushing mechanisms and telescopic rods.

DETAILED DESCRIPTION OF THE INVENTION

Figure 1:
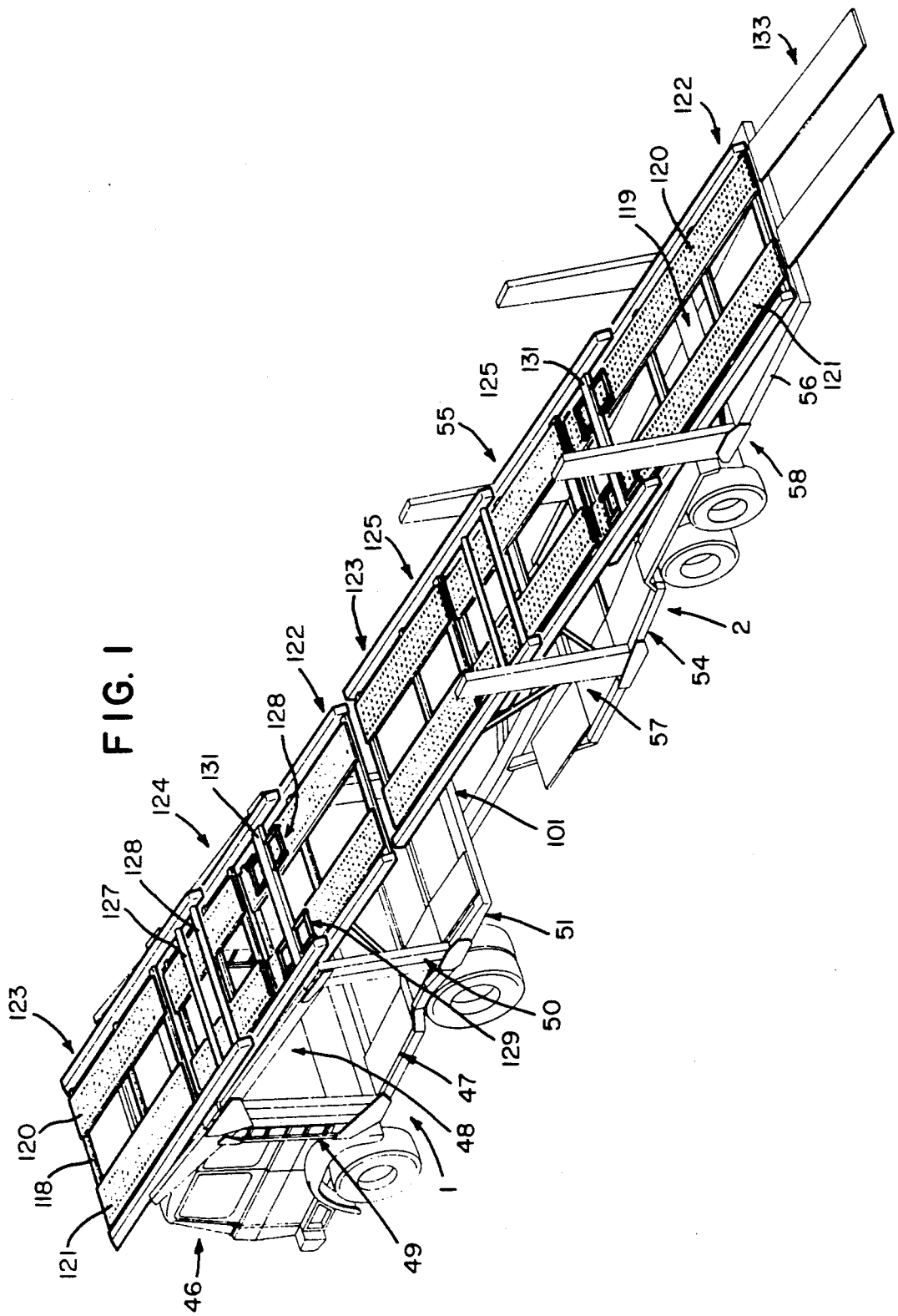
FIG. 1 is a general perspective view illustrating an example of an automobile carrier conforming with the invention showing the individual carrying platforms aligned to form an access ramp.

This invention concerns the association of a majority of support assembly units to an individual carrying platform per assembly, the latter being arranged along the same line of chassis posts or along successive and different lines so as to form a functionally complete rolling unit of the automobile carrier type making possible completely automated loading and unloading phases.

In fact, as will be seen below, the automobile carrier makes it possible in particular to form, along with the individual corresponding platforms, a true access ramp sloped from one end to the other of the carrier. The automobile to be loaded on the forward end of the truck may thus put itself in place by its own means by the shortest path.

The carrier is made up of a truck-tractor 1 and a trailer 2 of any kind, with front wheel drive, with central axles or any others. The version described below refers to a balanced trailer with three axles or central rolling gear.

The truck and the trailer are equipped with automobile carrying structures made up of unit carrying assemblies or supports, simple or double linked to each other through mechanical body elements for greater rigidity and stability of the assembly.

First below the various categories of carrying assemblies for the displacement of the platforms will be described, in a non exhaustive manner.

A unit carrying assembly is made by joining together to the truck or trailer chassis two support posts 3 and 4 parallel to each other and vertical or slightly sloped. Each support post includes at least one screw such as 5 or 6 on which is mounted a linking and carrying mechanism and, more specifically, a translation device, 7 or 8.

The screw is unique for each post and is actuated by a unique motive force for each platform associated to its linking and carrying mechanism.

The two translation devices 7 and 8 ensure the linkage of the pivoting support and, if applicable, pivoting-sliding motion with a movable platform type such as 9, of classical form or with specific features through an associated pivoting axis 10 or 11, if applicable, a sliding motion block.

The movable platform 9 is capable of compound movements in slope and in displacement in relation to the posts along their length or across them through the single simultaneous action control of screws 5 and 6 based on the single and sole motive power, for example a hydraulic or electrical motor backed up by an emergency manual action control.

The exact location of the pivoting axis 10 or 11 of the platform with respect to the corresponding translation and pivoting device 7 or 8 does not matter provided the latter does not dictate the kind of movements.

Before describing each carrying assembly making up the automobile carrier example chosen for illustration for this invention in detail, the basic translation and pivoting device should be described in general, then some of its variations and modes of execution with reference to FIGS. 12 to 25.

This is made up of a movable translation assembly 12 along the corresponding screw and borne by the latter as well as a sloping articulated linkage linking the platform to the movable assembly.

The movable translation assembly 12 is made up of an upper block 14 and a lower block 15 mounted on the same and unique screw 5 or 6 for each post and each platform. The upper block 14 ensures the pivoting linkage with the platform and the lower blocks ensures the pivoting articulation with one end of the sloping linkage 13 in order to achieve an articulated triangular assembly with three pivoting points.

For purposes of clarity, the three articulation points will be shown by the letters K, L, M relating respectively to the points situated on blocks 14 and 15 and on the platform at the end of the sloping linkage 13.

Figure 23:
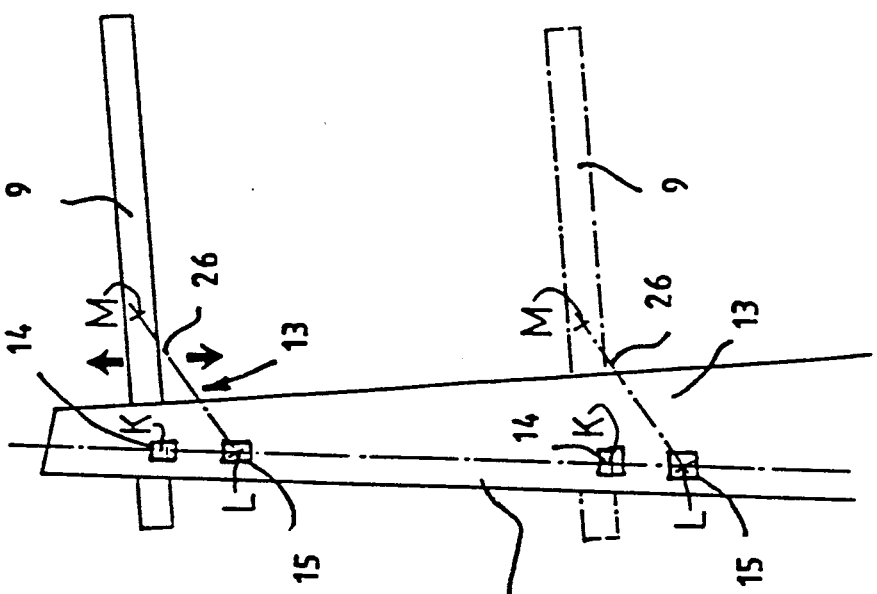
Figure 22:
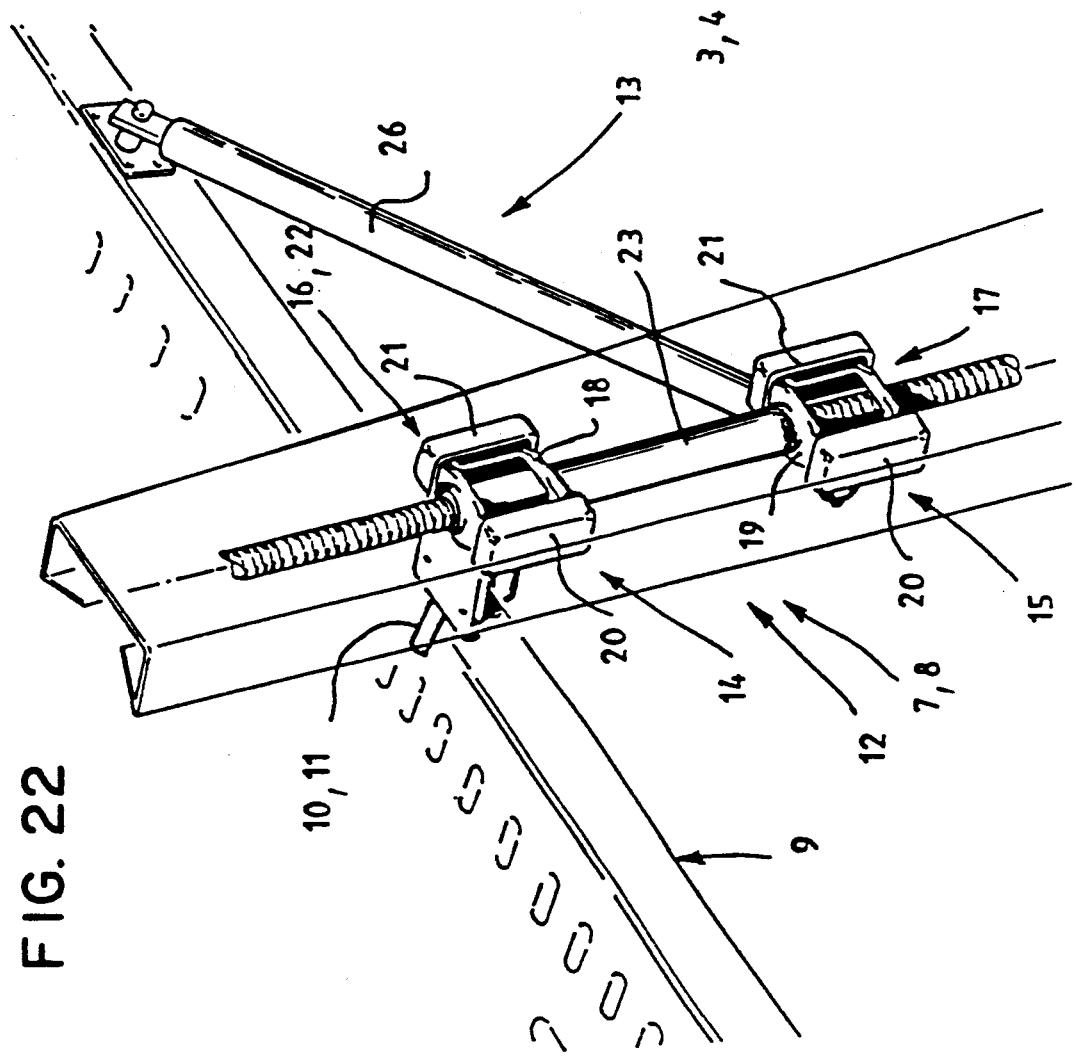

This invention covers the several variations of linking and carrying mechanisms, represented on FIGS. 12 to 25. The variations are as follows:

FIGS. 12 and 13: KL of constant length; LM of variable length
making possible all translation and pivoting movements of the platform;

FIGS. 14 and 15: KL of variable length; LM of constant length
making possible all translation and pivoting movements of the platform;

FIGS. 16 and 17: KL of variable length; LM of constant length
making possible all translation and pivoting movements of the platform;

FIGS. 18 and 19: KL of constant length; LM of variable length
making possible all translation and pivoting movements of the platform;

FIGS. 20 and 21: KL of constant length; LM of constant length
making possible a simple parallel displacement of the platform;

FIGS. 22 and 23: KL of constant length; LM of constant length making possible a simple parallel displacement of the platform;

24 and 25: KL of variable length; LM of constant length associated with a sliding movement of the platform making possible all movements desired for the platform with respect to a horizontal axis.

As will be seen below, depending on the variations, blocks 14 and 15 will be made up differently in order to enable the variation in distance between K and L and, if applicable, the variation of the length of linkage LM.

Depending on the case, the elements supported by the screws are nuts 16 with permanent or selective lock with the screw or sliding bushings 17.

The housings, such as 18 and 19 respectively of the nuts and bushings are provided laterally with pads 20 and 21 sliding along posts 3 and 4 in order to ensure the immobilization of the screw rotating on itself and then the guidance and stability of longitudinal movements.

Depending upon the execution mode of FIG. 12, upper block 14 is a nut 22 permanently locked on the screw. Housing 18 of the latter is linked rigidly through a tube 23 to housing 19 of the lower block. The latter is a sliding bushing 17 crossed by the screw. Thus the distance KL is maintained mechanically constant.

Housing 19 of bushing 17 brings articulation B of sloping linkage 13. The latter, in accordance with this mode of execution, is extensible, executed for example in the form of a telescopic rod 24, or through a jack which is its functional equivalent.

The rotation around the screw acts on nut 22 which is displaced up or down through translation dragging in its movements along the corresponding post sliding bushing 17 due to its fixing to it through tube 23.

The distance KL remaining constant, sloping movements are made by the extension or withdrawal of the telescopic rod 24 which may be an active rod, jack or other, or by the play of a lower stop 25 arranged in the lower part at the end of the platform in order to determine a slope at the end of the lower run, for example a slope corresponding to the loading position of the vehicle.

The weight of the vehicle loaded will automatically cause the rod to retract, that is to say, the distance LM to its minimum value after and during the lifting phase during which the platform slopes downward.

In the execution modes of FIGS. 14 to 17, the sloping linkage 13 corresponds to a constant LM distance achieved for example in the form of a rigid rod 26, that is to say, of fixed length.

The sloping variations are given by increases or decreases of the distance KL achieved in two different ways corresponding to the variations represented in FIGS. 14, 15 and 16, 17.

The first variation includes the same blocks, nut 22 and sliding bushing 17, as that previously described.

In accordance to a preferred mode, the arrangement is the reverse: nut 22 in the lower position and sliding bushing 17 in the upper position.

An external 27 stop linkage is simply made up in the form, for example of a rigid stem 28 joined at one of its extremities to housing 18 of nut 22 through a connecting plate and guided through sliding by foot 30 joined to the housing 19 of sliding bushing 17 or any other equivalent means, for example a chain or a cable.

In order to limit the spacing of the two blocks, a stop is provided, for example a boss 31 at the end of stem 28 or any other means.

In operation, distance KL is established at its maximum value by the weight of the platform, empty or loaded, reflected through the play of the pivoting coupling on the bushing in upper position, causing a corresponding raising thereof along the screw over a distance ending at the stopping at the end stop 31 of stem 28 thus determining the slope of the platform at its extreme low position.

This slope is maintained during the loading phase up to the high end of run position of the platform by the play of a high support point, for a example a stop 32, against which the end of the upper side of the platform rests in order to make it swing upward, (as represented by the arrows), through the effecting of the coupling resulting from the upward push of the lower nut.

The variation represented in FIGS. 16 and 17 achieves the same results without requiring the presence of a swinging stop in the high position.

It includes a lower block 15 in the form of a nut 33 similar to nut 22 permanently fastened to the screw. The upper block is a known releasable nut 34.

This releasable nut 34 makes possible a selectable fastening of the nut on the screw based on an external release or fastening control. Thus, merely by acting on this control, it is possible through fastening or release, to vary the distance KL during the rotation of the screw and thus to determine the slope of the platform.

In practice only the high and low end of run slopes are used in operation as an automobile carrier. In fact, the lower slope position corresponds to the loading, that is to say, the rise of the vehicle onto the platform and the higher slope position to the appearance of the vehicle during transportation.

It is therefore sufficient to program the control of the releasable screw before reaching these extreme positions, high and low, in order for the slope to be at its predetermined high and low end of run value.

Another variation represented in FIGS. 18 and 19 presents upper 14 and lower 15 identical blocks made in the form of nuts like those referenced 22. The sloping linkage 13 is of variable length in the form of a telescopic rod, for example, that already referenced 24 or of a jack.

These nuts, with identical threads, threaded by the same screw, are displaced at a constant distance one from the other. Length KL therefore remains constant.

LM being variable, an operating configuration of the platform position is achieved which is analogous to that of the first variation. The sloping movements of the platform are achieved by the extension or retraction of telescopic rod 24 or of its replacement jack.

Thus, in lower position the contact with a lower stop 35 initiates the slope and it is the length of extension of the rod which determines the extent of sloping and final lower end of run presentation of the platform corresponding to the vehicle loading position.

As for the first variation, the weight of the vehicle loaded will automatically bring the telescopic rod in lower retracted position, that is to say distance KL to its minimum value after a first lifting displacement which will raise the platform from its lower stop support.

The platform will slope correspondingly in order to keep this slope up to the higher end of run position where a possible second stop 36 represented by a dotted line can raise the platform through swinging.

The variations represented in FIGS. 20, 21, 22 and 23 are simplified variations which allow translation with a fixed slope only.

In fact, according to these variations, the two blocks, upper 14 and lower 15, are identical, made in the form of nuts such as those already referenced 22, or in a different manner, linked by a rigid tube, for example that already referenced 23. The sloping linkage 13 shows in each instance a fixed length rod 26.

The nuts, of identical thread, threaded by the same screw, are displaced at a constant distance one from the other, KL and LM remaining of constant length, the movements of the screw cause a longitudinal displacement of the assembly in translation along the posts.

Likewise, tube 23 forces blocks 14 and 15 to remain at a constant distance one from the other.

Figure 24:
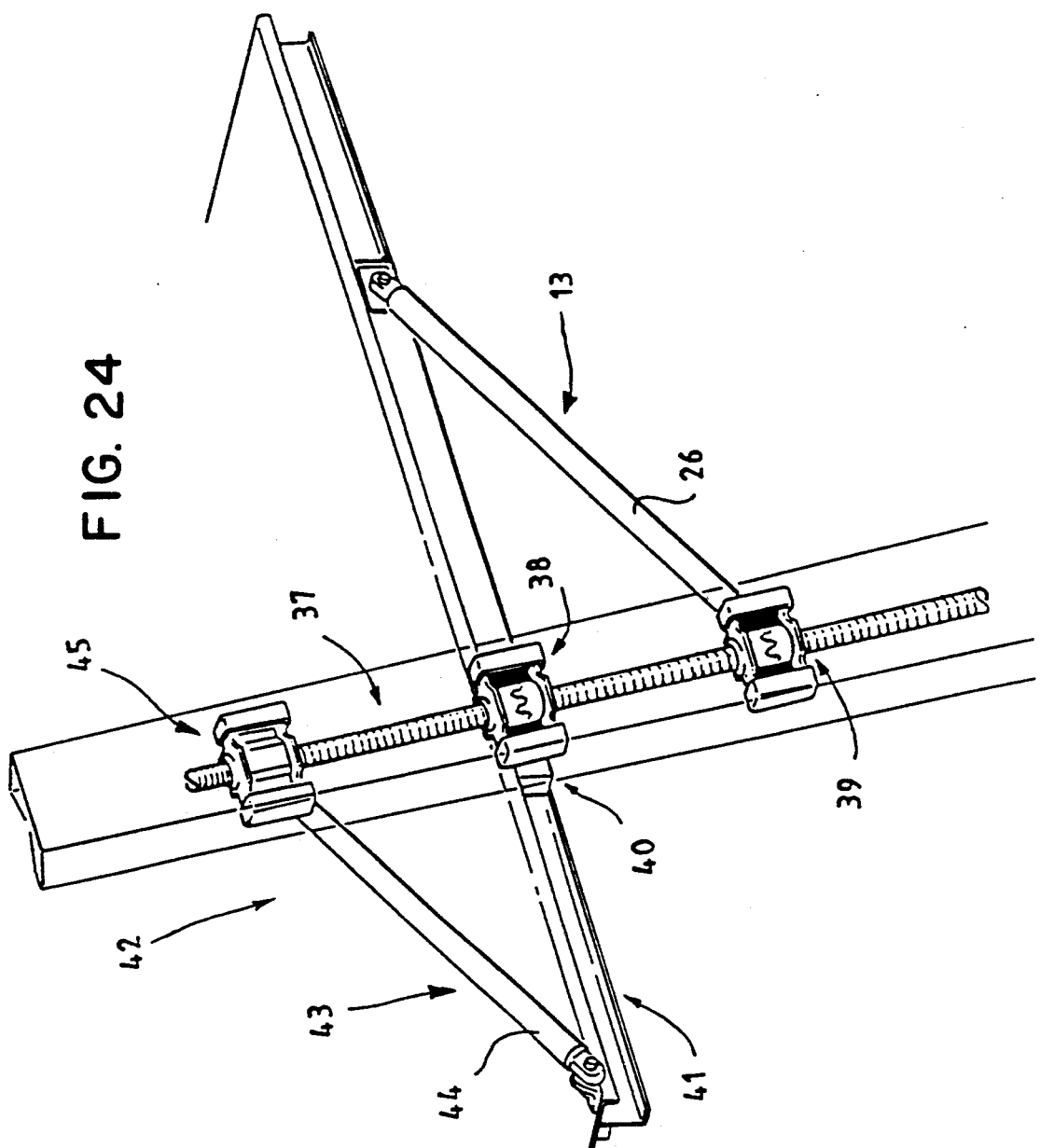
Figure 25:
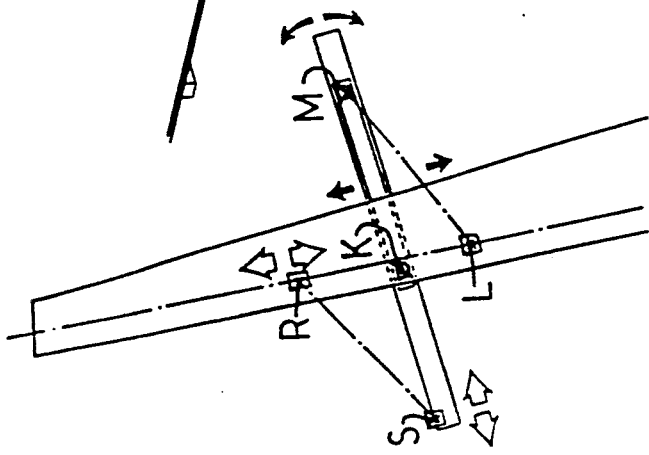

FIGS. 24 and 25 represent a variation providing an additional translation mechanism 37.

This variation proceeds from the same general inventive design according to which the movements of the carrying platform are achieved on the basis of a single screw for each post, a screw which is rotated by a unique motive force.

Thus, in accordance with this variation, additional displacement movements of the platform across the carrying posts are obtained.

In accordance with this variation, the blocks, upper 14 and lower 15, are made in the form of two releasable nuts 38 and 39.

Articulated linkage 13 is a rod of fixed length such as that already referenced 26.

The carrying linkage between the platform and the post is of the pivoting-sliding type through a slide or pad 40 on which is displaced an edge section 41 of the platform.

The assembly is coupled by a sliding mechanism 42 made by an articulated linkage 43 in the form of a sloping rod 44 articulated on the one hand on the platform and on the other hand on a block, for example an upper 45 similar to these already described, thus establishing an additional triangulation reference RKS, R being the articulation with respect to the screw and S with respect to the platform.

The sloping and displacement movements of the platform along the carrying posts result from selective controls for fastening or release of the releasable nuts 38 and 39.

For the purpose of programming and coordinating the movements, the sliding movements of the platform are subjected directly to those of the screw through nut 45 and articulated linkage 43 of constant length.

The presence of releasable nuts makes it possible to achieve and select separately all possible movements of the platform:

parallel displacement only when all the nuts are fastened;

swinging only when the lower nut alone is fastened;

sliding only when both releasable nuts are in released state.

Moreover, through the use of the individual controls, all combinations of the preceding movements may be obtained Of course, other operating modes become possible by substituting for nut 45 the various blocks examined: translation bushing, releasable nut, and for linkage 43 a telescopic rod or a jack making up its functional equivalent.

This invention consists of the association of the various unit carrying assemblies described above in order to form an articulated automobile carrier of a new kind.

The truck 1 includes a cab 46 and a chassis 47 equipped with an automobile carrying structure 48 capable of receiving and carrying four automobiles. This structure includes a double forward carrying unit 49, for example, with two platforms and a double rear carrying unit 50, as well as a lower carrying area 51.

The truck has, in the rear, a hook coupling 52 linking it in an articulated manner to the trailer 2 through a towbar 53.

The trailer 2 includes a chassis 54 lengthened by a multi-element automobile carrying structure 55 borne by its rolling gear. The latter is made up of an underframe in the lower carrying area formed by the succession of lower platforms 56 and of two carrying units with individual platforms including a forward composite assembly 57 and a rear composite assembly 58 making it possible to receive and carry up to eight automobiles.

Each carrying assembly has specific features. They will be examined individually in separate descriptions.

First the individual movable platforms carried by these assemblies should be referenced.

Henceforward the references A, B, C, . . . , I, J, will be used, assigned as follows:

A:trailer upper rear platform,
B:trailer upper middle platform,
C:trailer upper front platform,
D:truck upper forward platform,
E:truck upper middle platform,
F:truck upper rear platform,
G:trailer lower forward platform,
H:trailer intermediate forward platform,
I:trailer lower middle platform,
J:trailer intermediate rear platform;

The double forward unit assembly 49 of the truck is made up of two truck forward support unit assemblies 59 and 60 which actuate platform D and, partially, platform F.

The truck body is terminated by the double rear assembly 50 made up of two rear support unit assemblies 61 and 62 which actuate respectively platforms E and F for swinging-pivoting movements.

The first assembly 59 actuating platform D is a mechanism with a simple nut due to the simple pivoting movement required for this platform. The latter shows a pivoting axis 63 at about mid-length, borne by a lengthening 64 of an upper linkage element 65 between the forward and rear posts.

Platform E is mounted swinging on the second support assembly 60 by a mechanism with a simple nut fastened to the corresponding screw and by constant length rod 66 articulated on the first support unit assembly 61 of the rear post. The swinging is thus achieved with variable slope and depth.

Platform F requires variations in slope. It is linked by two nuts mounted on the screws of the posts of the second rear support unit 62 through a swinging linkage of fixed triangular shape 67 the peak of which makes up an articulation 68 with slide displacement along the edges of platform F. The ends of this platform are mounted on a fixed pivoting axis 69 resting on the fixed upper mechanical linkage 65 linking the posts.

According to a variation, this pivoting axis 69 may be made displaceable along platform F or along mechanical linkage 65 by the use, for example, of jacks.

The trailer forward composite assembly 57 is a grouping of several support unit assemblies developing around a double forward post 70 made up of two front posts 71 and 72 juxtaposed.

More specifically, it groups four support unit assemblies a first group of which consisting of two upper translation 73 and pivoting 74 assemblies maneuvered from a double forward post 70 and of a second group of assemblies controlled separately.

The first group consists of translation assembly 73 and pivoting assembly 74 controlling respectively platforms C and B.

The second group consists of a swinging assembly 75 controlling the movements of intermediate platform H and of a lower assembly 76 mounted on chassis elements 77 and which control the movements of lower platform G. These platforms are both articulated on the one hand on an oblique forward post 78 and on the other hand, for platform H, on an oblique rear post 79, and for platform G on a pivoting support point 80.

The first group covers upper platforms C and B with respect to the maximum authorized height for a road load. In order to satisfy these requirements, the automobiles must be placed horizontally or sloped.

For platform C, it is a question of a final upper horizontal position with respect to a sloping position of loading corresponding to the placement and immobilization of the automobile on the platform.

Thus, for the purposes of the loading, platform C must be able to slope to reach above platform H by covering it partially and then rise and regain a horizontal position, and vice versa.

It is affected by translation movements and compound sloping-swinging movements by a stop against neighboring platform H.

Figure 9:
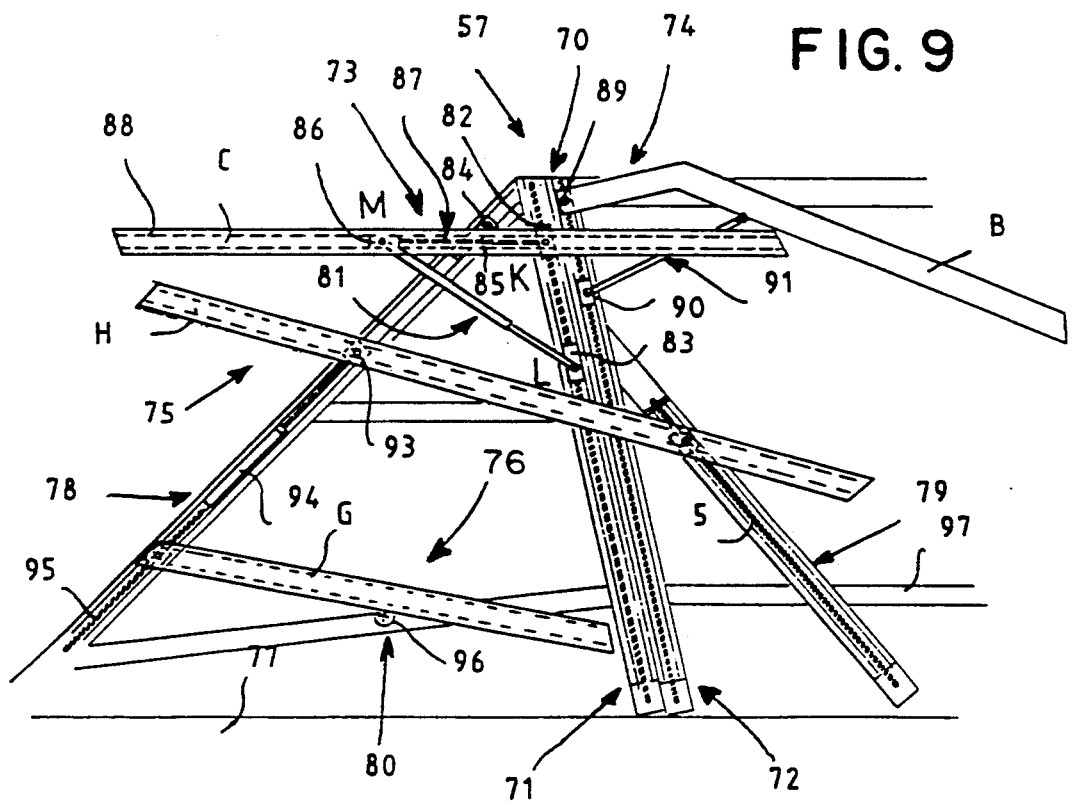

To accomplish this, with reference to FIG. 9, platform C is mounted articulated on the one hand on the first from post 70 in accordance with a movable translation device of the telescopic rod type 81 and with two nuts 82 and 83 operating with an end stop, a device which conforms with that represented on FIGS. 18 and 19 and articulated on the other hand on the forward oblique post 78.

The articulated linkage of platform C on the forward oblique post 78 is effected by a pivoting axis on a translation part 84 displaceable through sliding along the said forward oblique post.

For the requirements of longitudinal translation movements of platform C, the translation device with two nuts 82 and 83 fastened on a screw, for example, 5 and with telescopic rod 81 differs slightly from the example type described above in that the linkage referenced KM of the triangle KLM is maintained at a constant length. This is done with a flexible or rigid mechanical link 85 of constant length which forms with part 86 of articulation of rod 81 on platform C and upper nut 82 a slide 87 which can received translation movements along a groove 88 provided along the longitudinal edge of platform C.

There are thus on each side of the trailer four pivoting articulation points making it possible through the sole rotation motive power of screw 5 of the first forward post, to put in work all the movements required for the loading and unloading of and by platform C.

The articulated linkage on the forward oblique post 78 is therefore necessary. It has the double purpose of guiding and of an additional movable mechanical support.

For reasons of clarity, the specific operation and various movements of platform C will now be described.

Platform C is displaced between an upper horizontal position and a lower sloping position in which it is parallel to platform H and in which it partially covers the latter. From its upper horizontal position, platform C is brought to a lower sloping position through the sole action on the post screw which forces the nuts to move down causing simultaneously a downward vertical translation of the platform. During this movement, the support-guiding along the forward oblique post by translation part 84 causes the longitudinal displacement of the platform on slide 87. As soon as stop contact is made with platform H, the translation movement is translated into a pivoting-swinging movement by displacement of the platform on slide 87 and lengthening of telescopic rod 81 as the additional downward movement of nuts 82 and 83 continues until complete contact covering by platform C of platform H.

The lifting movement is effected by reverse action on the post screw and reverse movements of the platform of its different movable organs or elements.

The parallel astride-support of platform C on platform H makes its loading possible by an automobile through the sloping area formed by the succession of adjacent platforms H, I and J in continuity of position in the same plane, that is to say, the formation of an access ramp.

Platform B is a simple sloping platform, with translation displacement brought about by two simple nuts 89 and 90 fastened on the corresponding screw, for example screw 5 of the second forward post 72, and a fixed length rod 91. Its original and permanent slope is given by its general "V" shape.

Platform H is articulated by a nut 92 on a motive screw, for example 5, provided in the rear oblique post 79 while the other articulated linkage is a pivoting support on a translation part 93 sliding within the forward oblique post 78 at the end of a sloping jack 94. The movements are swinging movements resulting from the two sloping forces originating from jack 94 and nut 92 in accordance with the control sequences of the operating program.

One of the two linkage articulations of platform H with one or the other oblique post is made sliding along this post.

Platform G is articulated simply at the end on a motive screw 95 of the forward oblique post 78 and rests on the pivoting point 80 located approximately mid-length so as to create a swinging stop 96. This pivoting point is, for example, movable along the lower linkage frame rail 97 provided in the carrying structure of the trailer.

This composite assembly ensures that the platforms concerned have sufficient freedom of movement to integrate themselves perfectly in the automated process of the loading and unloading phases.

The trailer rear support assembly 58 has a double rear post 98 made up of a rear translation assembly 99 for platform A and a rear swinging assembly 100 for platform J each containing a displacement mechanism, on the one hand, for platform A for vertical translation movements with constant slope through two simple nuts and a constant length rod, means such as described above, and on the other hand, for intermediate platform J for slight swinging movements towards the front during its raising originating from a linkage to the post through a nut and constant length rod, means such as described above with reference to FIGS. 14 and 15.

Platform I is mounted swinging on the trailer chassis between a raised position in which it participates in the formation of the main access ramp and in which it receives its load and a retracted position by swinging toward the front as represented in FIGS. 44 and 45.

The movement control mechanisms of the individual platforms make possible a great variety of movements. Only those necessary to the automatic loading and putting in place of the platforms so that the load conforms to the load plan are described here.

In an operating configuration, some intermediate platforms adopt a presentation adapted in position and slope to make up several access ramps.

There is, at first, a continuous and divisible main access ramp 101 from one end to the other of the carrier formed by platforms D, E, F, G, I and J arranged in succession (FIG. 38) in order to make possible, especially, the direct access of the furthest automobile, that is to say that borne by platform D over the cab of the truck but also other automobiles borne by the platforms making up this ramp.

In this carrier, there are also other access ramps formed with platforms.

A lower ramp 102 made up of platforms J, I, and G leading to the rear truck carrying area (FIG. 37) and a connected ramp 103 made up of platforms J, I and H leading to platform C (FIG. 36) should be noted.

These features are more easily noted by observing FIGS. 34 to 45.

The actuation of the platforms in displacement originates from hydraulic or electric motors such as 104 common to two motive screws 5 and 6 of each unit carrying assembly. The force is transmitted to a transversal axis 105 ending in two movement transmitting cases such as 106 and 107 each arranged with respect to one or the other end of each screw of the same motor assembly.

Each motor 104 is supplied during the time corresponding to the operating sequence in the program of the robot used to manage the assembly operation, a program adaptable to variations in loading.

We will now examine the general operating control making possible the complete automation of the loading and unloading phases.

As indicated, the motive force making possible the actuation of the screws and the correlated displacement of the corresponding platform comes from hydraulic or electric motors supplied by a source of energy and the operation of which is controlled by a robot 108 or a programmer following a modifiable operating program.

Hereafter the example will be adopted of the hydraulic motors 104 supplied from a source 109 of compressed fluid, for example a pump with or without battery or the hydraulic plant of the truck.

Figure 10:
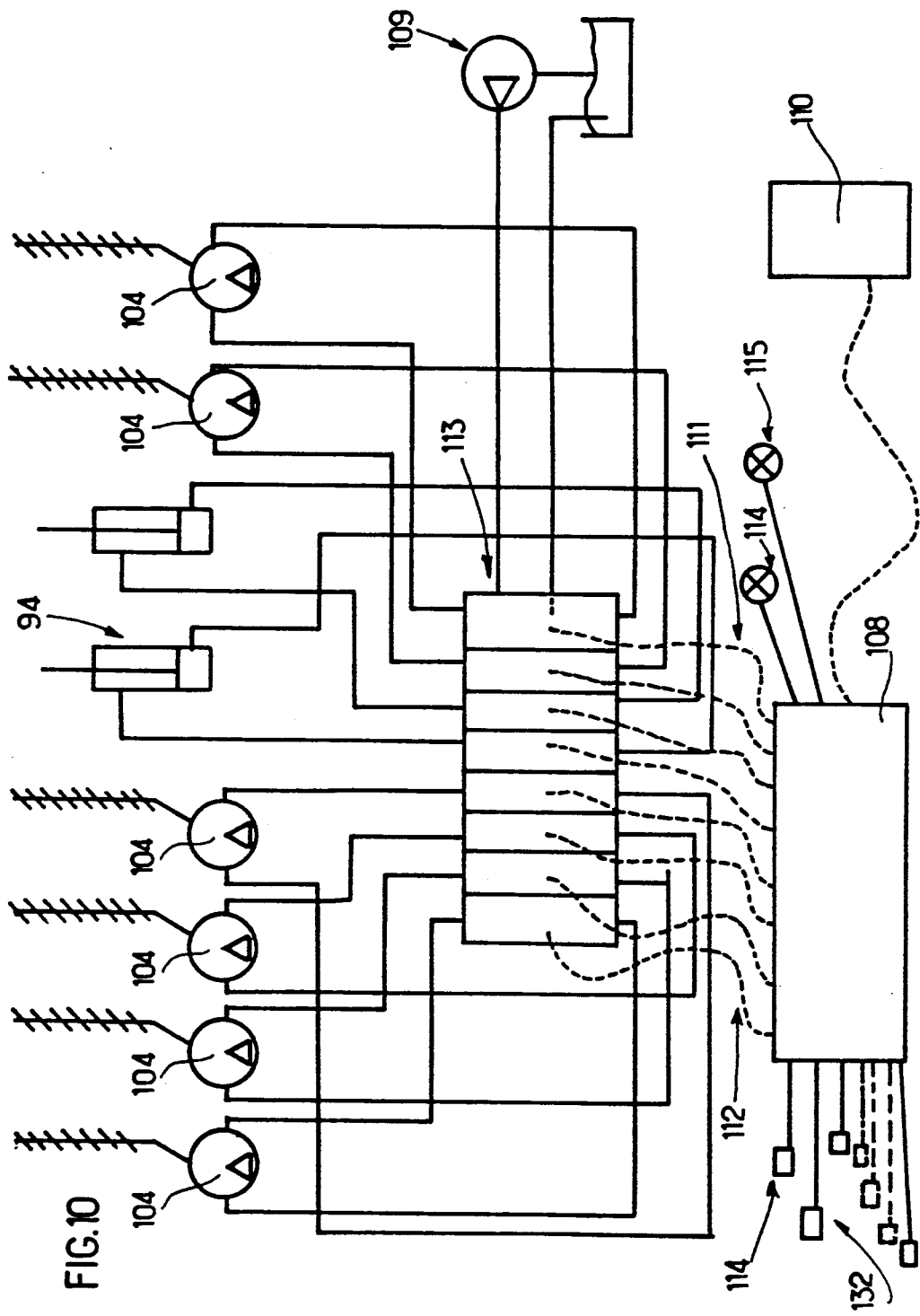
FIG. 10 is the hydraulic schematic drawing of an example with centralized controls based on a robot.
Figure 11:
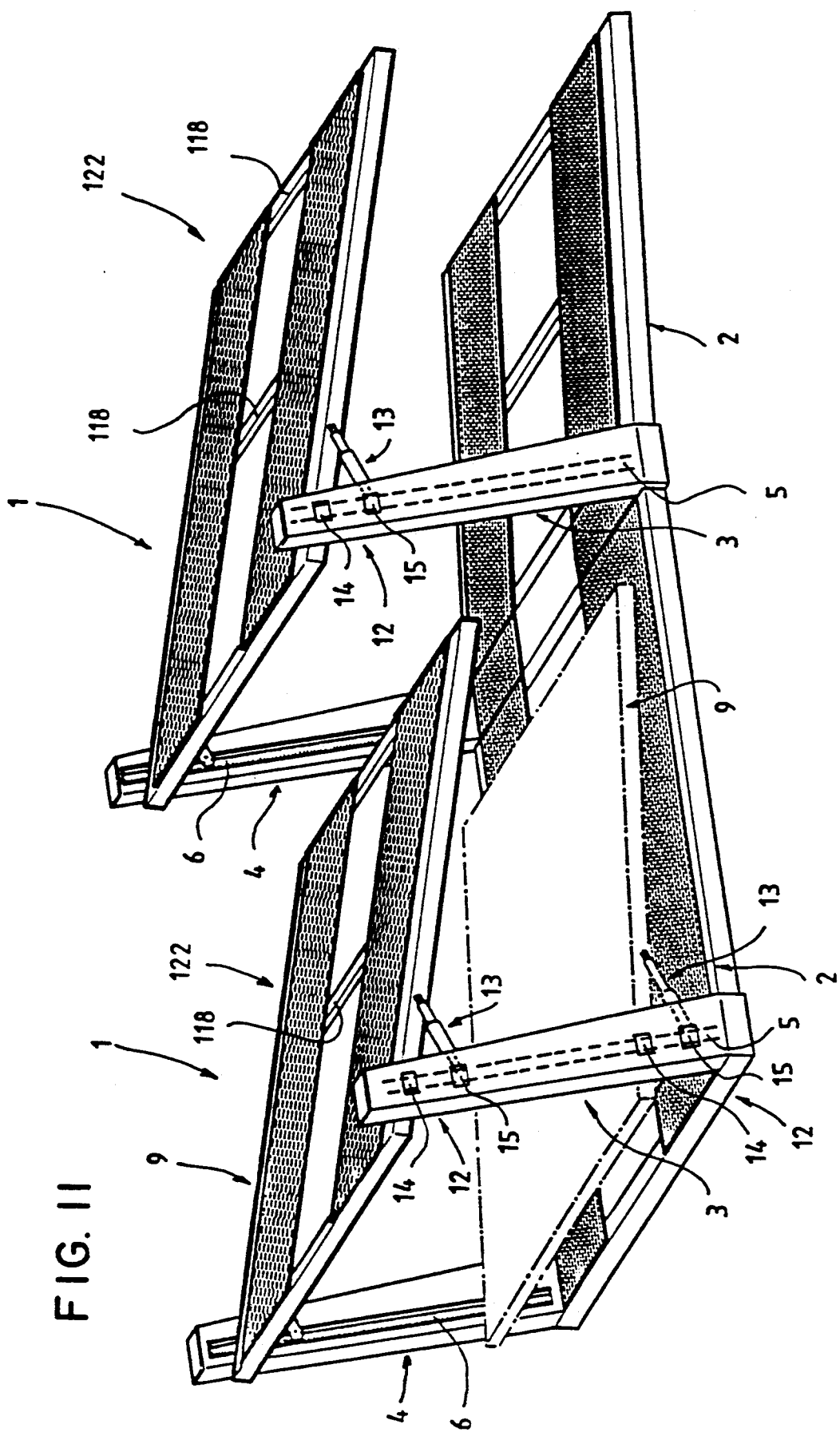
FIG. 11 is a schematic perspective view showing two simple support assemblies with a single platform, one of which is also represented in lowered position by dashed lines.

The assembly schematic is that represented in FIG. 10. It includes a control case 110 located, for example, at the rear end of the trailer linked to the programmed robot 108 controlling, through two multi-wire links 111 and 112, a hydraulic distributor 113 of supply to the hydraulic motors 104 for rotation of screws 5 and 6. The motors are supplied from the source 109 of fluid under pressure, for example the hydraulic pump of the truck. An indication, for example by two indicator lights, one green 114 and the other red 115, arranged for example at the rear end of the trailer, makes it possible to note the state of inhibition of robot 108 upon each new command.

The program menu is displayed on a screen, for example a liquid crystal display, accompanied by a keyboard making it possible to enter into the central unit of robot 108 the characteristics of the loading.

Figure 2:
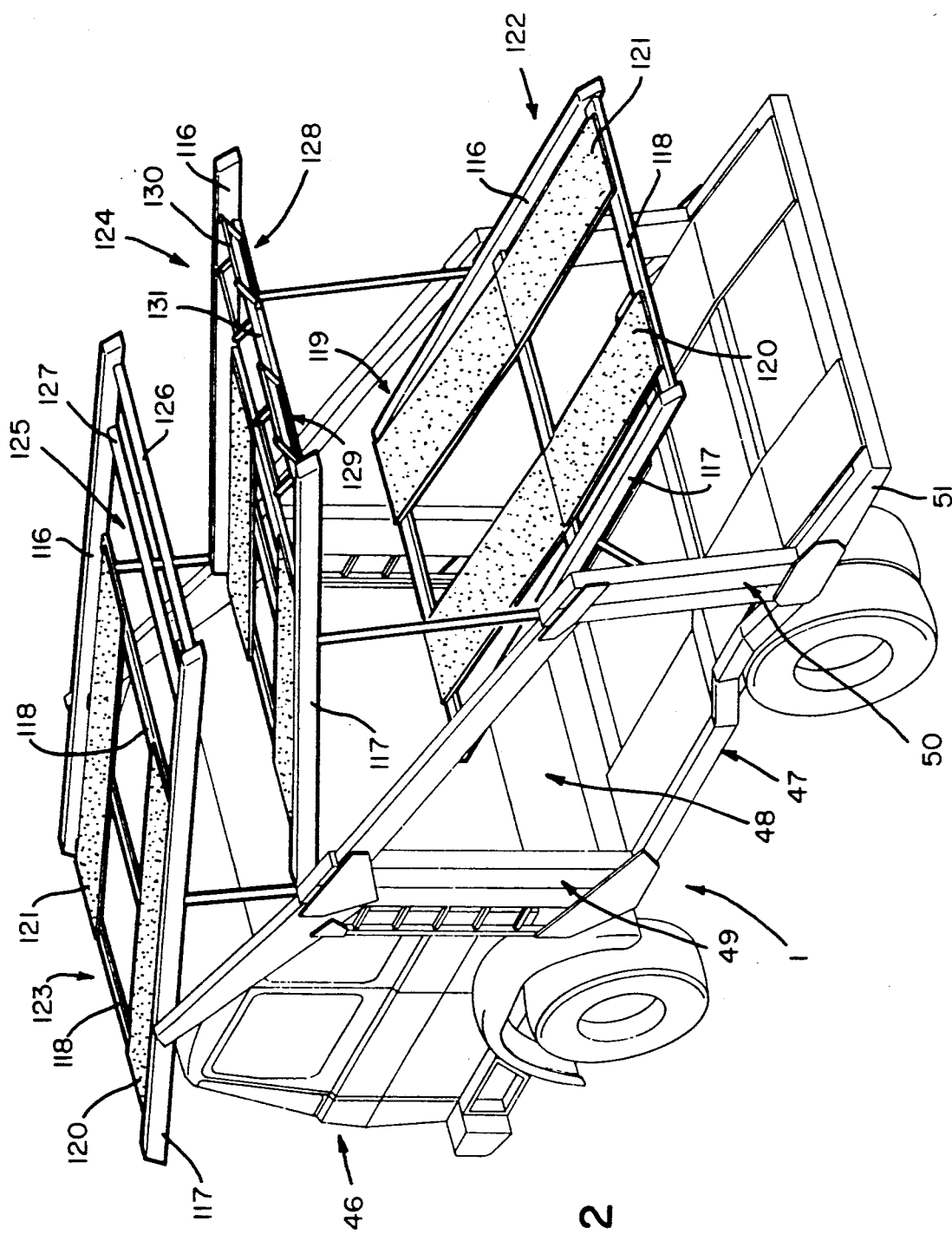
FIGS. 2 and ,3 are perspective views of the carrier vehicle truck respectively in the configuration of raised platforms and then aligned in position of an access ramp.
Figure 3:
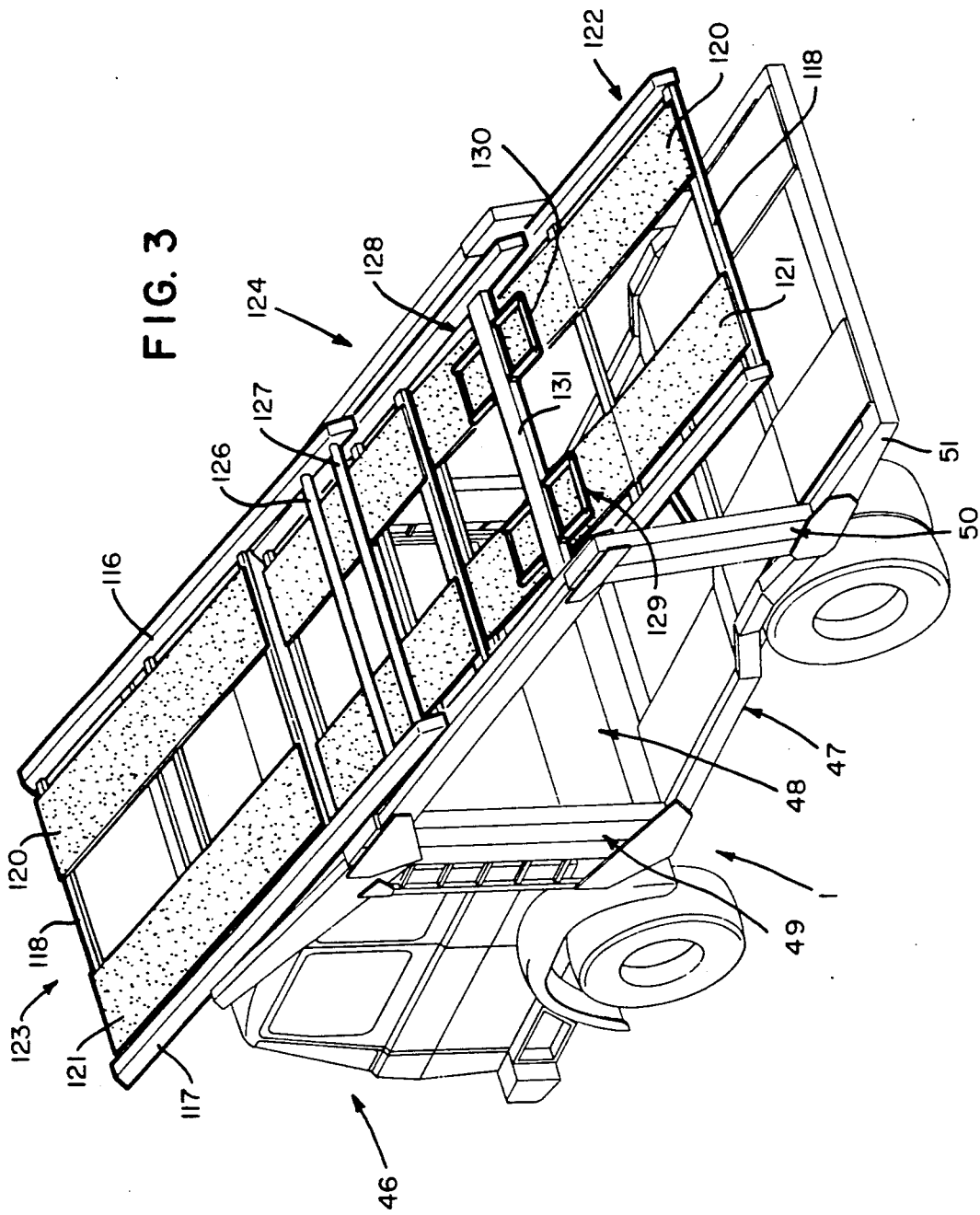
Figure 6:
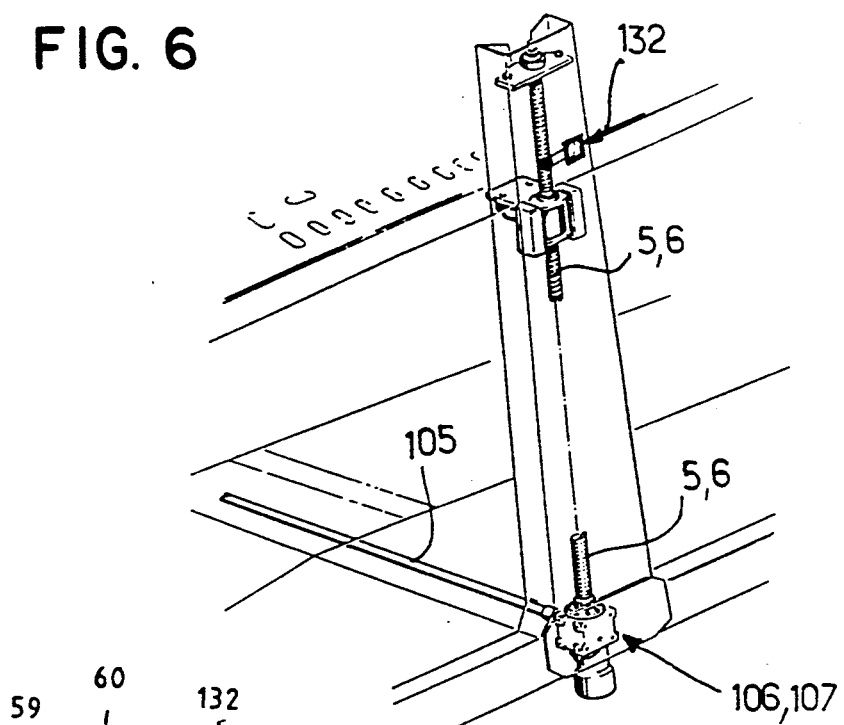
FIGS. 6 to 9 are schematic side views on a larger scale of the following parts found on the carrier represented in FIGS. 4 and 5.
Figure 7:
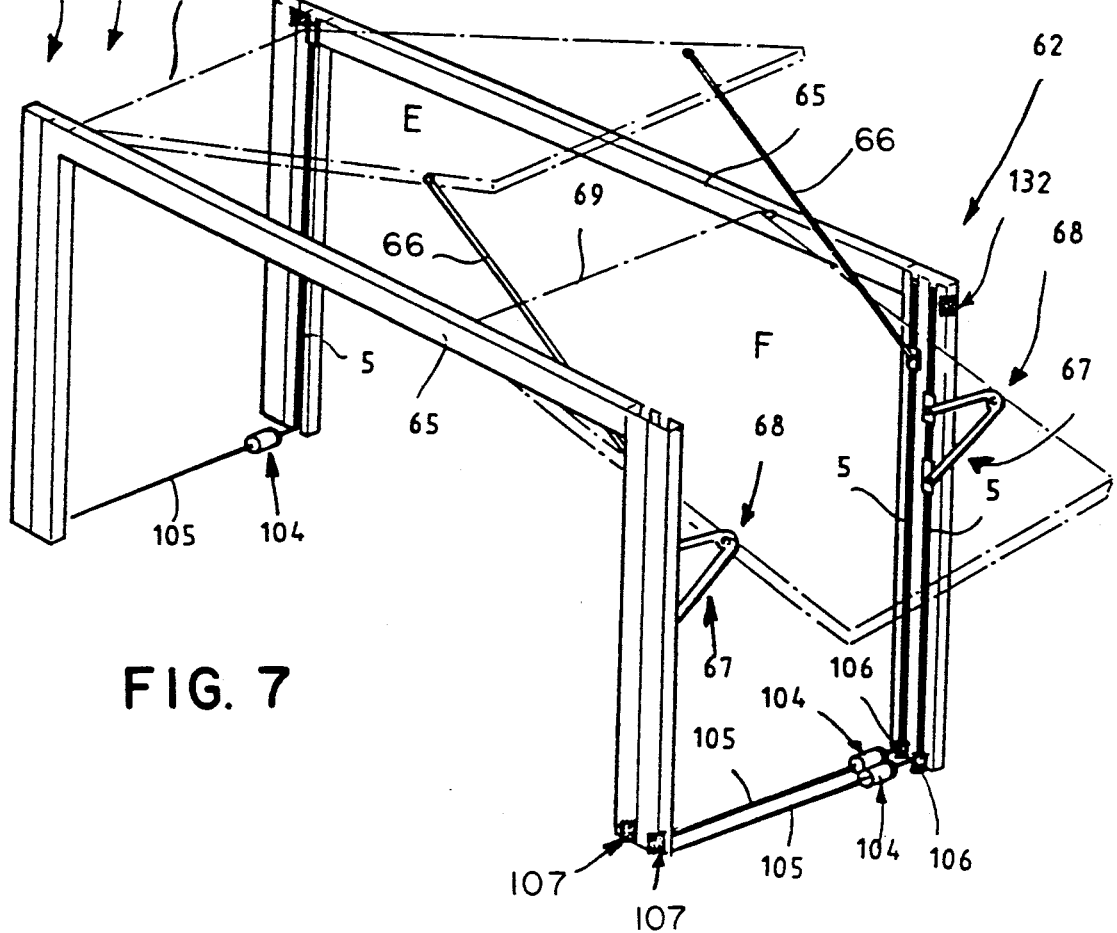
Figure 8:
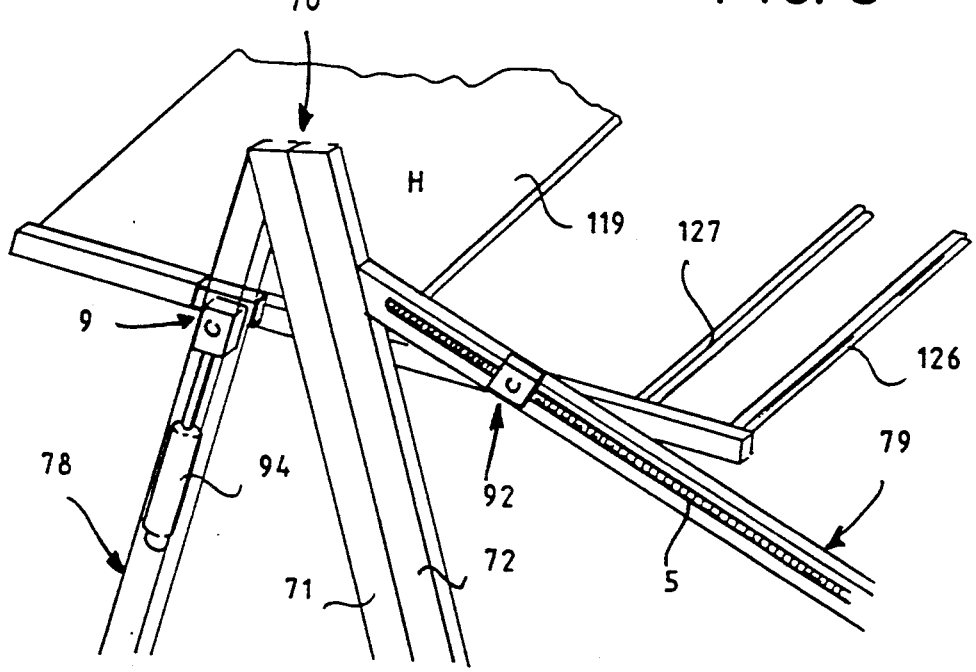

The individual platforms used in the articulated automobile carrier in accordance with the invention are preferably those represented in FIGS. 1, 2 and 3 because they make it possible to derive maximum advantage of space through the use of the placement of the automobiles.

They consist of two frame rails 116 and 117 linked with each other mechanically by several cross pieces such as 118 bearing a floor 119, for example in the form of two sheets of perforated metal 120 and 121 corresponding to the two rolling lines of the automobiles carried.

There are three types of platforms: simple platforms 122 with continuous floor, housing platforms 123 and platforms 124 with integrated blocks.

The last two categories present a reduced floor length and a forward area of immobilization 125 of the front or rear wheel trains of the automobiles carried. This area is equipped, for example, with two end transversal bars 126 and 127 for the purpose of blocking the front or rear wheels or equipped, for example, with two blocks 128 and 129 each in the form of frames such as 130 developed on two opposite surfaces on either side of a unique transversal bar 131.

Figure 37:
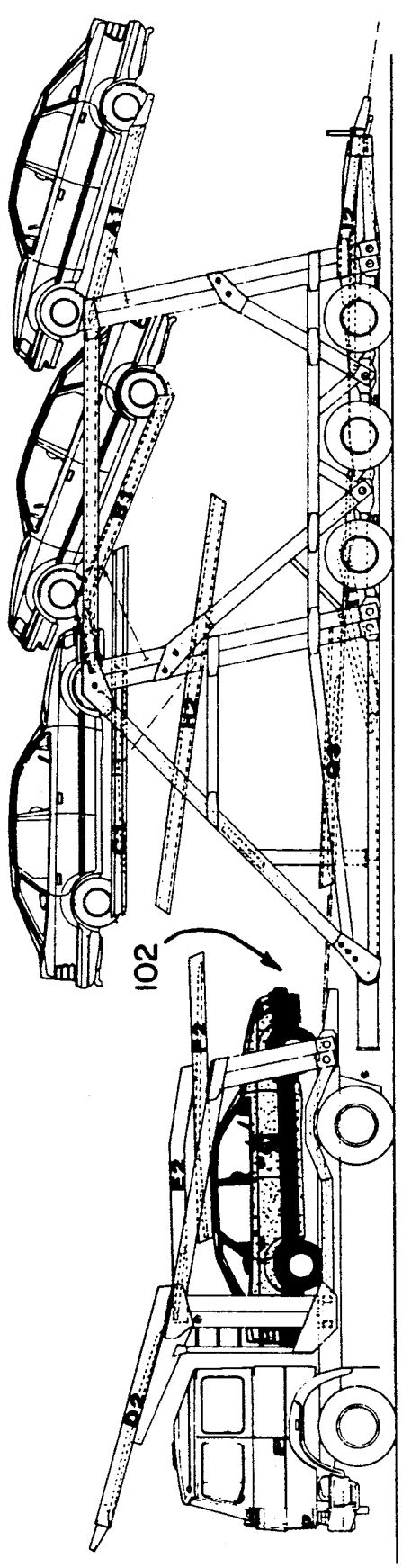
Figure 38:
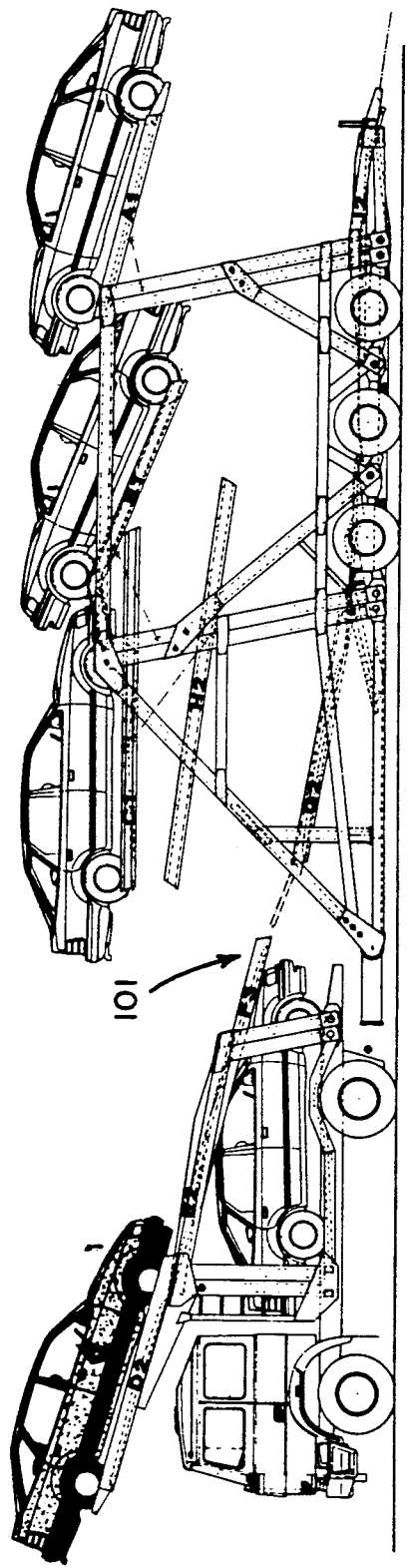

The individual platforms are made to make through juxtaposition or straddling-alignment in two operating configurations the oblique access ramp 101 and the lower ramp 102 through the juxtaposition of the lower platforms I and J in the lower section as seen in FIGS. 37 and 38.

In order to coordinate the various stages of operation and to authorize the passage from one stage to the next, every screw or platform is provided with at least one sensor such as 132 which may be a microswitch or end of run contact, feeler, detector or other similar element the detection signals of which make it possible to validate the command of the following operating stage.

The operations of the automobile carrier in accordance with the invention and limited to the various loading phases, unloading phases resulting therefrom in reverse order will now be explained with the help of FIGS. 34 to 45.

This is the general operation controlled by robot 108.

For reasons of clarity of the description of the operation below, the drawing and reference conventions are as follows:
the order number of the automobiles is recorded in Roman numerals in an arrow on the automobile,
the platforms are referenced, as already indicated, by the letters A, B, . . . I, J.,
the letters designating the platforms are followed by a number 1, 2, or 3 which indicates their successive positions, the number 1 designating the final position in loaded state, the upper number 2 or 3 the other extreme position corresponding in general to the initial loading position, the number 2 for the panels including a number 3 designates an intermediate position.

The carrier is placed in the loading area. After immobilization, the driver, who represents the only manpower required for the loading, pre-arranges the trailer and the truck and specifically the carrying structures to suit the possible characteristics of the load through the configuration of the program of the robot.

In order to do this, he brings the program up to the control box 110 and chooses in the menu the sub-program appropriate to the characteristics of his load. There is, in fact, a sufficient variety of possible choices within the general program to configure the program in accordance with the specific features of the loading to be made and more generally all real cases of loading.

The carrier is ready to receive its load after the configuration and validation of the loading program.

The motive system for the movement of the platforms is activated through one of the first commands of the program. Likewise, one of the initial phases consists in verifying and eventually placing in initial position all the carrying platforms including the rear access floor 133 making possible the loading of the trailer from the ground.

Figure 34:
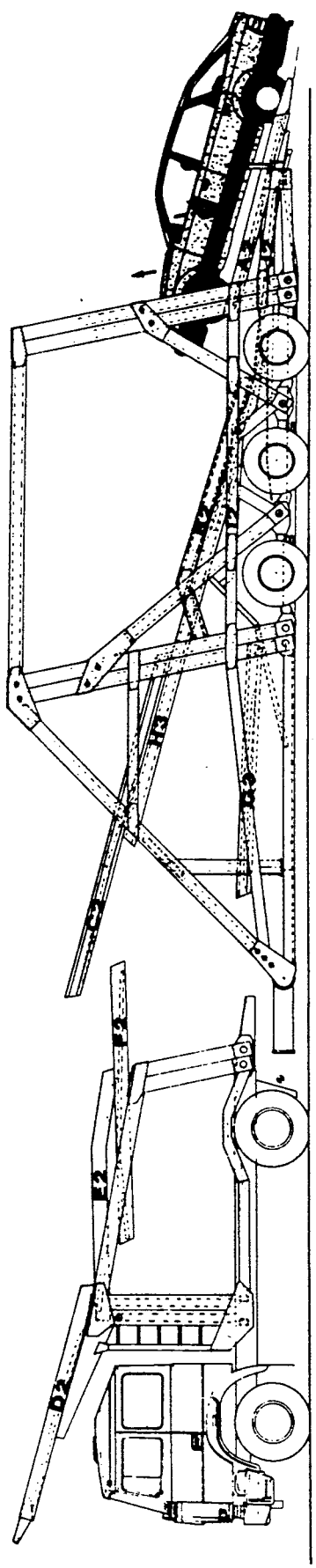

After the putting in place of the rear access floor 133 making up the access ramp to the trailer from the ground, the first automobile is placed on platform A (FIG. 34).

The next stage in the program is reached each time by a command calling for the program to follow through action on the box 110 as soon as the green availability indicator light is on and the end of stage arising from the robot taking into account the detection signals coming from sensors 132 or their associated circuits.

The following command from the robot consists in raising platform A loaded with the first automobile in running position, that is to say upper slope referenced A1.

At the end of each stage a new command should be issued to the robot at the box for the development of the next stage.

Figure 35:
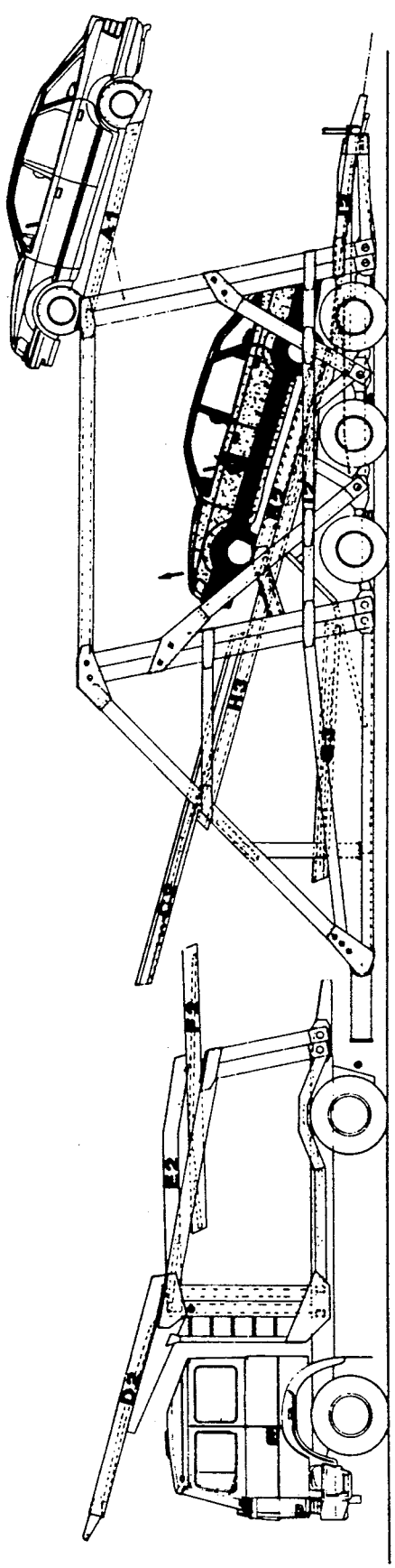

The second automobile is raised onto the trailer and progresses up to its placement on platform B through the small access ramp formed by platform J in low position (FIG. 35).

The appropriate command to the corresponding motor causes platform B and its load made up of the second automobile to be raised up to position B1 of transportation detected by the corresponding sensor.

Figure 36:
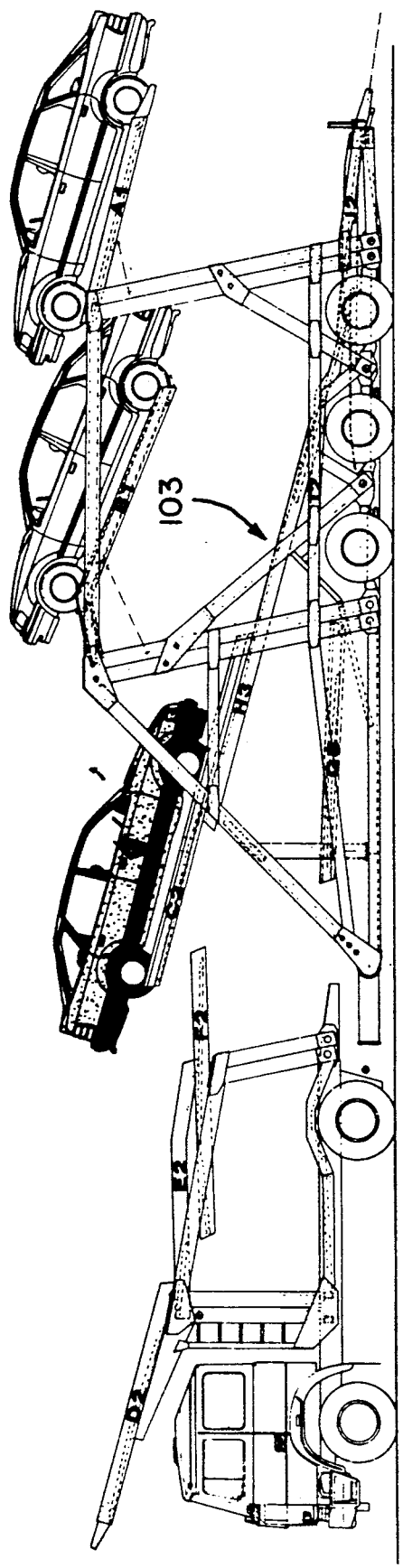

The third automobile accesses area C in sloping position through the ramp formed by platforms J, I and H. This automobile is put in place in rear gear for reasons of the necessity of housing its hood under the front of the second automobile (FIG. 36).

Platform C rises and swings toward a horizontal position and ends horizontally in upper C1 transportation position detected by the corresponding sensor. The fourth automobile is placed in rear gear on the lower support area of the truck by using the lower ramp 102 formed by platforms J and G and possibly an accessory platform (FIG. 37).

The fifth automobile is put in place in rear gear for purposes of road plan and space by using the main oblique access ramp 101 made up by the succession of platforms J, I, G, F, E and D in positions suitably sloped as automatically controlled by the robot, in order to form a continuous slope which will be used by the next three automobiles and first by the fifth automobile which ends up at the end of the ramp on platform D (FIG. 38).

Figure 39:
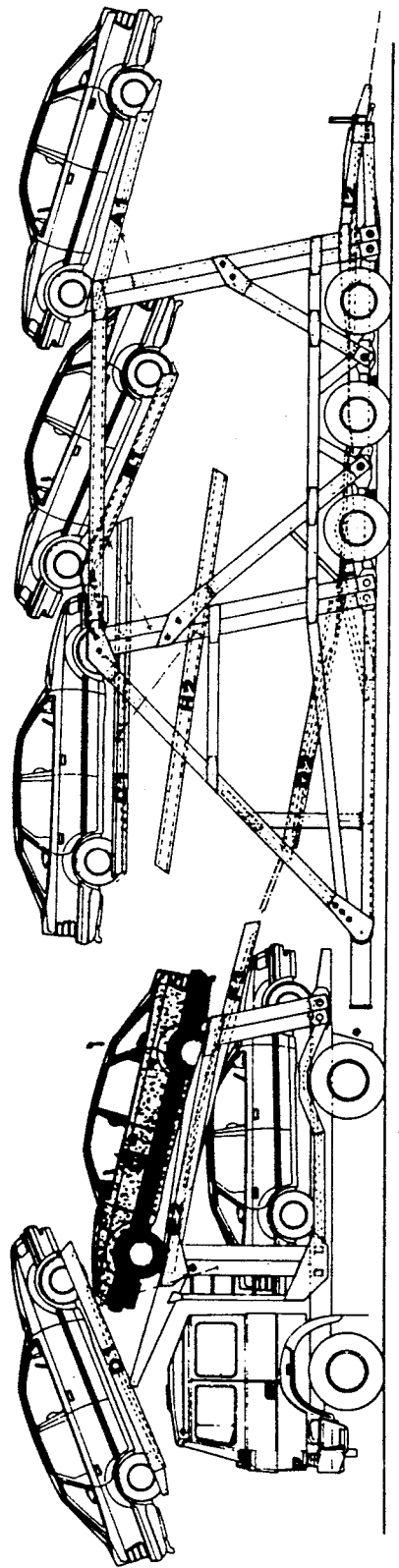

Platform D is then tilted in rolling position D1 detected by the corresponding sensor, while the sixth automobile accesses its position on platform E through the same ramp 101 (FIG. 39).

Platform E is swung forward so that the front part of the automobile it carries is housed under the neighboring automobile carried by platform D while the seventh automobile is put in place on platform F still using the same access ramp 101 (FIG. 40).

After swinging of platform F up to place it in rolling position F1, the truck automobile carrying structure is fully loaded and configured to travel.

Platform G is then lowered to receive, in rear gear, the eighth automobile and is found in this configuration in intermediate position G3 (FIG. 41).

Figures 42, 43:
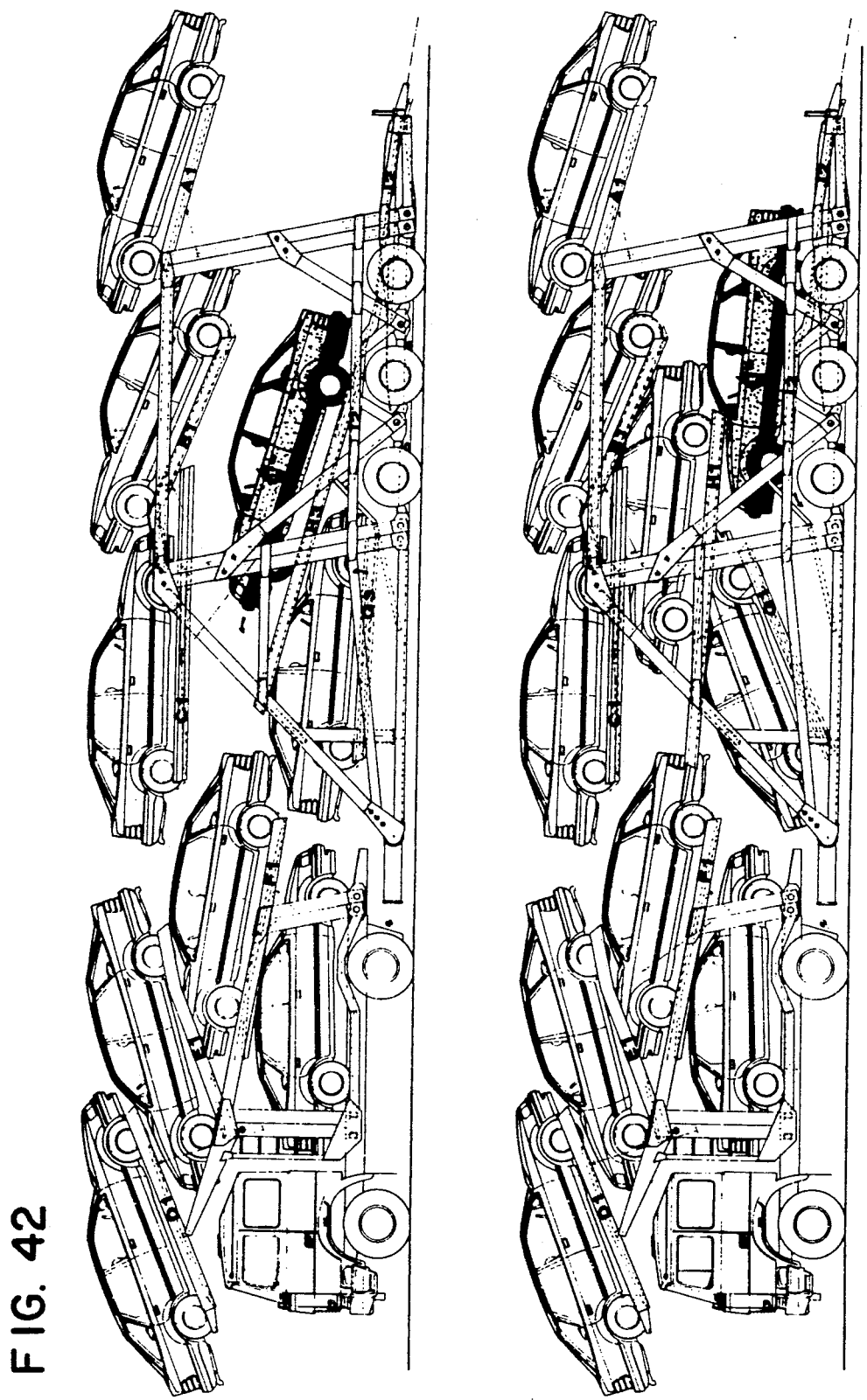

Platform H thus receives the ninth automobile through the remaining part of the access ramp formed by platforms J, I, and H (FIG. 42).

Platform H is then raised and brought back in rolling position, up to the horizontal, in position H1, detected by the corresponding sensor, making it possible for the automobile carried to be housed perfectly under the two adjacent upper automobiles, while platform G is swung forward for the same housing reasons and platform I receives the tenth automobile (FIG. 43).

Platform I swings forward to make it possible for the automobile carried to be housed under the automobiles carried by platforms G and H while the loading of the eleventh automobile on platform J in low position J2 follows (FIG. 44).

Platform J rises and swings slightly forward to occupy its rolling position J1 and the last automobile is raised to the fixed trailer rear platform occupying the free space between the chassis and the raised position of platform J.

The load is then in rolling configuration, and just the final safety operations are effected: rigging in accordance with regulations, various checks and the command for ending of the program to robot 108.

The automobile carrier in accordance with this invention was described in detail above in basic form. It is understood, however, that the protection extends to all direct and near variations derived from the means described without any inventive contribution, as well as to all simple modifications and substitutions and the field of equivalents.

It is therefore to be understood that within the scope of the appended claims, the present invention may be practiced otherwise than as specifically described herein.

I claim:

1. An articulated automobile carrier vehicle, comprising:
    a truck vehicle;
    a trailer vehicle;
    first and second pairs of laterally spaced, upstanding support post assemblies fixedly mounted upon said truck vehicle;
    third and fourth pairs of laterally spaced, upstanding support post assemblies fixedly mounted upon said trailer vehicle;
    a plurality of platforms translatably movable in elevation and pivotably movable in inclination upon said first, second, third, and fourth pairs of laterally spaced, upstanding support post assemblies; and
    drive screw means, mounted upon said first, second, third, and fourth pairs of laterally spaced, upstanding support post assemblies so as to be disposed interiorly within said first, second, third, and fourth pairs of laterally spaced, upstanding support post assemblies in an enclosed manner, operatively connected with said plurality of platforms mounted upon said first, second, third, and fourth pairs of laterally spaced, upstanding support post assemblies for moving said plurality of platforms between different elevational and inclination positions relative to said first, second, third, and fourth pairs of laterally spaced, upstanding support post assemblies so as to permit a plurality of motor vehicles to be laded upon and unloaded from said plurality of platforms of both said truck and trailer vehicles.

2. A vehicle as set forth in claim 1, wherein:
said truck vehicle comprises three of said plurality of platforms; and
said trailer vehicle comprises seven of said plurality of platforms.

3. A vehicle as set forth in claim 2, wherein:
said three platforms of said truck vehicle comprise an upper front platform, and upper middle platform, and an upper rear platform; and
said seven platforms of said trailer vehicle comprise an upper rear platform, an upper middle platform, an upper front platform, a lower front platform, an intermediate front platform, a lower central platform, and an intermediate rear platform.

4. A vehicle as set forth in claim 3, wherein:
said truck vehicle further comprises a chassis support section disposed beneath said upper middle and upper rear platforms of said truck vehicle; and
said trailer vehicle further comprises a chassis support section disposed beneath said intermediate rear platform of said trailer vehicle,
whereby said articulated vehicle can transport twelve motor vehicles upon said truck and trailer vehicles.

5. A vehicle as set forth in claim 1, wherein:
said plurality of platforms disposed upon said truck and trailer vehicles are movable to predetermined elevational and inclination positions so as to relatively overlap each other in order to form and define a motor vehicle access ramp which extends from a rearmost end of said trailer vehicle to a forwardmost end of said truck vehicle.

6. A vehicle as set forth in claim 1, further comprising:
means defined upon said plurality of platforms for immobilizing a motor vehicle placed upon any one of said platforms so as to retain said motor vehicle upon said platform during transportation of said motor vehicles by said articulated vehicle.

7. A vehicle as set forth in claim 6, wherein said immobilizing means comprises:
a pair of longitudinally spaced, transversely extending parallel bars for engaging one set of wheels of said motor vehicle placed upon said any one of said platforms.

8. A vehicle as set forth in claim 6, wherein said immobilizing means comprises:
a transverse bar; and
a pair of rectangular block frames secured to opposite sides of said transverse bar for engaging respective wheels of said motor vehicle placed upon said any one of said platforms.

9. A vehicle as set forth in claim 1, further comprising:
hydraulic motor means operatively connected with said drive screw means for rotating said drive screw means in order to move said plurality of platforms.

10. A vehicle as set forth in claim 9, further comprising:
program means for sequentially operating said hydraulic motor means in order to move said plurality of platforms in a predetermined mode.

11. A vehicle as set forth in claim 18, further comprising:
sensor means for generating an end-of-movement signal upon completion of movement of a predetermined one of said plurality of platforms so as to permit subsequent movement of another one of said plurality of platforms.

* * * * *